United States Patent
Ley

(10) Patent No.: US 11,188,911 B2
(45) Date of Patent: Nov. 30, 2021

(54) OBJECT ORIENTED SMART CONTRACTS FOR UTXO-BASED BLOCKCHAINS

(71) Applicant: BCDB, INC., Berkeley, CA (US)

(72) Inventor: Clemens Ley, Berkeley, CA (US)

(73) Assignee: BCDB, INC., Berkeley, CA (US)

( * ) Notice: Subject to any disclaimer, the term of this patent is extended or adjusted under 35 U.S.C. 154(b) by 0 days.

(21) Appl. No.: 17/266,212

(22) PCT Filed: Aug. 21, 2019

(86) PCT No.: PCT/US2019/047411
§ 371 (c)(1),
(2) Date: Feb. 5, 2021

(87) PCT Pub. No.: WO2020/041411
PCT Pub. Date: Feb. 27, 2020

(65) Prior Publication Data
US 2021/0209596 A1 Jul. 8, 2021

Related U.S. Application Data

(60) Provisional application No. 62/838,157, filed on Apr. 24, 2019, provisional application No. 62/720,665, filed on Aug. 21, 2018.

(51) Int. Cl.
*G06F 9/44* (2018.01)
*G06Q 20/40* (2012.01)
(Continued)

(52) U.S. Cl.
CPC ............ *G06Q 20/401* (2013.01); *G06F 8/31* (2013.01); *G06F 9/4488* (2018.02); *G06F 9/467* (2013.01);
(Continued)

(58) Field of Classification Search
None
See application file for complete search history.

(56) References Cited

U.S. PATENT DOCUMENTS 7,650,276 B2 * 1/2010 O'Neil ................. G06F 16/958
704/8
10,362,103 B2 * 7/2019 Soni .................... H04L 67/1097
(Continued)

FOREIGN PATENT DOCUMENTS

WO 2017145006 A1 8/2017

OTHER PUBLICATIONS

Aiken, A. The Cool Reference Manual. [online], 2000 [retrieved on Dec. 4, 2019.] Retrieved from the Internet < http://theory.stanford.edu/-aiken/software/cool/cool-manual.pdf > 30 pages.
(Continued)

*Primary Examiner* — Anna C Deng
(74) *Attorney, Agent, or Firm* — Koffsky Schwalb LLC

(57) ABSTRACT

Disclosed is method and system for turning existing object-oriented programming languages into smart contract languages without introducing new syntactic features. The invented method and system provide a protocol that enables storing a history of computations on a decentralized computer network, such as a UTXO-based blockchain system, for any object-oriented computer language. The invented method and system further provide for storing and updating data on blockchains, where such blockchains may be used in cryptocurrency applications and for smart contracts.

10 Claims, 14 Drawing Sheets

(51) Int. Cl.
*G06F 9/448* (2018.01)
*G06F 16/27* (2019.01)
*G06F 21/60* (2013.01)
*G06F 9/46* (2006.01)
*G06F 9/50* (2006.01)
*G06F 8/30* (2018.01)
*G06Q 20/06* (2012.01)

(52) U.S. Cl.
CPC ............ *G06F 9/5016* (2013.01); *G06F 16/27* (2019.01); *G06F 21/606* (2013.01); *G06Q 20/065* (2013.01); *G06Q 2220/00* (2013.01); *H04L 2209/38* (2013.01); *H04L 2463/102* (2013.01)

(56) References Cited

U.S. PATENT DOCUMENTS

| | | | | |
|---|---|---|---|---|
| 2004/0123048 A1* | 6/2004 | Mullins | ............... | G06F 16/9574 711/141 |
| 2008/0275977 A1* | 11/2008 | Schmidt | .............. | G06F 16/9577 709/223 |
| 2018/0005186 A1* | 1/2018 | Hunn | ................... | G06F 40/103 |
| 2018/0095733 A1* | 4/2018 | Torman | .................... | G06F 8/30 |
| 2018/0174255 A1* | 6/2018 | Hunn | .................... | H04L 9/3247 |
| 2019/0377561 A1* | 12/2019 | Yang | ......................... | G06F 8/51 |
| 2020/0298590 A1* | 9/2020 | Teo | ........................ | G06F 3/1205 |

OTHER PUBLICATIONS

Andrew Stone, "Bitcoin Cash Scripting Applications: Representative Tokens (OP_Group)", Oct. 16, 2017, 10 pages.
Craig Wright, "Turing Complete nBitcoin Script White Paper", Apr. 10, 2016, 15 pages.
Etherium. Solidity Documentation. [online], May 16, 2018 [retrieved on Dec. 4, 2019.] Retrieved from the Internet <https://readthedocs.org/projects/solidity/downloads/pdf/v0.4.24/> 143 pages.
Flavien Charlon, "Open Assets Protocol", open-assets-protocol/specification.mediawiki, Dec. 12, 2013, 8 pages.
International Search Report and Written Opinion for App. No. PCT/US19/47411, dated Jan. 17, 2020, 20 pages.
Killerstorm, "EPOBC_simple", May 12, 2015, https://github.com/chromaway/ngcccbase/wiki/EPOBC_simple, printed Apr. 21, 2021, 6 pages.
Y. Assia, et al., "Colored Coins whitepaper", 2012, https://docs.google.com/document/d/1AnkP_cVZTCMLIzw4DvsW6M8Q2JC0llzrTLuoWu2z1BE/edit, printed Apr. 21, 2021, 23 pages.

* cited by examiner

[Variable Definition Example]

[Object Creation Example 1]

[Bcool Contexts]

[Ctx-Assign]

[Ctx-New]

[Ctx-Let]

OBJECT ORIENTED SMART CONTRACTS FOR UTXO-BASED BLOCKCHAINS

REFERENCE TO PRIOR APPLICATIONS

"This application is a U.S. national phase of PCT Application No. PCT/US2019/047411, filed Aug. 21, 2019, which claims the benefit of the following two applications:
1) U.S. Provisional Application Ser. No. 62/720,665 filed on Aug. 21, 2018; and
2) U.S. Provisional Application Ser. No. 62/838,157 filed on Apr. 24, 2019.
No disclaimer is made to any portions of any of the above applications, and each of the above applications is hereby incorporated by reference in its entirety.

FIELD OF THE DISCLOSURE

The present invention relates to an improved method storing and updating data structures in blockchains, where such blockchains may be used in cryptocurrency applications.

BACKGROUND

Cryptocurrency, also generally referred to as tokens, coins, digital tokens, digital coins, crypto-tokens, and crypto-coins, may be digital or virtual units of credit (e.g., monetary credit) that are created, stored, transferred, and/or otherwise managed in a decentralized manner, that is, without central management (e.g., by a governmental entity or other regulatory authority). For example, cryptocurrency may be implemented on blockchains or other distributed database structures located on decentralized computer network/system. Digital coins may each be implemented on an independent blockchain database or platform. Digital tokens may be implemented or hosted on an existing blockchain database or platform, such as via implementing a smart contract on the existing blockchain database or platform. Digital tokens may have various functions, such as for use as a currency, an asset (or representation thereof), a security, and an evidence or proof (e.g., of access or membership, etc.). A token may be issued under a token contract implementing a token standard (specification), which can set and define the parameters and rules of token manipulation, user interaction, and other functions and transactions. To date, a vast majority of digital tokens have been implemented by executing smart contracts on the Ethereum platform under Ethereum Request for Comments (ERC) standards, such as the ERC-20, ERC-223, ERC-621, ERC-721, and the like.

There are two components to a cryptocurrency: a data structure called a blockchain and a consensus algorithm that is used to update the blockchain.

Blockchain data structures are processed by a decentralized computer network.

FIG. 1 illustrates one embodiment of the computer system 100 of the present invention. A user at a local computer 103, or the local computer 103 on its own, may interact with a decentralized computer network 101 through a communication network 110, such as the Internet. The decentralized computer network 101 includes a distributed database.

FIG. 2 illustrates an embodiment of a computer 201 of the decentralized computer network 101 in FIG. 1. The computer 201 can be configured to implement any computing system disclosed in the present application. For example, the computer 201 may be programmed to or otherwise configured to implement blockchain structures, and digital tokens and/or smart contracts thereon. The computer 201 can be an electronic device of a user or a computer system that is remotely located with respect to the electronic device. The electronic device can be a mobile electronic device. The computer can be a server connected to a plurality of electronic devices of a plurality of users (e.g., participants of the information exchange platform).

The computer 201 includes a central processing unit (CPU, also "processor" and "computer processor" herein) 205, which can be a single core or multi core processor, or a plurality of processors for parallel processing. The CPU can be the processor as described above. The computer 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. In some cases, the communication interface may allow the computer to be in communication with another device such as the imaging device or audio device. The computer may be able to receive input data from the coupled devices for analysis. The computer 201 can include or be in communication with an electronic display 235 that comprises a user interface 240, such as a scanning interface. The memory 210, storage unit 215, interface 220, the display 235, and peripheral devices 225 are in communication with the CPU 205 through a communication bus (solid lines), such as a motherboard. The storage unit 215 can be a data storage unit (or data repository) for storing data. The computer 201 can be operatively coupled to a communication network 230 with the aid of the communication interface 220. The communication network 230 can be the Internet, an internet and/or extranet, or an intranet and/or extranet that is in communication with the Internet. The communication network 230 in some cases is a telecommunication and/or data network. The communication network 230 can include one or more computer servers, which can enable distributed computing, such as cloud computing. The communication network 230, in some cases with the aid of the computer 201, can implement a peer-to-peer communication network, which may enable devices coupled to the computer 201 to behave as a client or a server.

Each of the components of the invented computer system 100 (local computer 103 and computers of the decentralized computer network 101) in FIG. 1 may be operatively connected to one another via one or more networks 110 or any communication links that allows transmission of data from one component to another. For example, the respective hardware components, if any, may comprise network adaptors allowing unidirectional and/or bidirectional communication with one or more networks. For instance, the user devices and the distributed database (e.g., nodes or components thereof) may be in communication via the one or more networks 110 to transmit and/or receive relevant data.

The distributed database of the decentralized computer network 101 may be a blockchain. The blockchain may be a distributed ledger enabling the storage of data records as unique blocks connected by one or more secure links. The decentralized computer network containing a blockchain may be cryptographically secured. A given block in a blockchain may associate transaction data with a timestamp. In the blockchain, duplicate data can be recorded as unique blocks instead of as identical copies of data. A given block may comprise data of a previous block to the given block (e.g., wherein the data of the previous block is hashed), making the blockchain essentially immutable, as data once recorded in a block in the distributed ledger cannot be modified or removed without triggering inconsistency with the linked blocks. This immutable property can provide particular benefits to implementing digital tokens, such as to prevent forgery or other frauds in processing digital credits. A blockchain may comprise or implement one or more smart contracts (implementing token standards), as described elsewhere herein.

For example, the distributed database of the decentralized computer network 101 may store one or more definitions of what constitutes a valid token on the blockchain (or otherwise definitions for token issuance). The definitions may be constructed in a variety of formats, such as, but not limited to a programming language (e.g., Javascript, C, assembly code, etc.), any other formal language such as mathematics (e.g., set theory, lambda calculus, etc.), natural language, other languages, or a combination thereof. The definitions may be stored on the blockchain via different methods. In some instances, the definitions may be stored on the distributed database directly. Alternatively, or in addition, the definitions may be indirectly stored, such as via anchoring, to the distributed database. For example, the definitions can be stored with an external server, such as in one or more external databases, and an anchor (e.g., hash, universal resource locator (URL), other reference, etc.) to the definitions can be stored on the distributed database to store the definitions by reference. The definitions can be stored by reference via any other method. The definitions or anchors thereof may be stored as plain text in the distributed database. The definitions or anchors thereof may be stored on the distributed database in unencrypted form. Alternatively, the definitions or anchors thereof may be stored on the distributed database in encoded form, encrypted form, compressed form, or a combination thereof. In some instances, the definitions or anchors thereof may be stored as standalone text. In some instances, the definitions or anchors thereof may be stored as part of, and/or in the form of, output scripts, OP_RETURN scripts (script opcode to mark a transaction output as invalid), multisignature (multisig) addresses, P2SH scripts, and other formats.

The distributed database may be stored in one or more nodes. The one or more nodes may be distributed in one or more computer systems or devices, such as those described herein. When the distributed database is updated by one of the nodes in the one or more nodes, it may be updated in each node of the one or more nodes, such as via the network 110. The distributed database may be publicly accessed by any node. Beneficially, the distributed nature of the database may be managed without having a central authority present.

The distributed database of the decentralized computer network 101 may implement one or more smart contracts, including the token contracts. A contract may implement a token standard. In some instances, the smart contracts may be created, modified, viewed, or otherwise accessed via a user interface. The user interface may be a graphical user interface (GUI). A user interface, such as the interface, may be provided by an external server. The external server may or may not be specific to the distributed database. For example, an external server specific to the distributed database may provide services customized for interacting with the specific distributed database, such as by offering services for creating, modifying, viewing, or otherwise accessing smart contracts implemented, or for implementation, on the distributed database. Such services may be used via an interface offered by the external server. For example, the interface may be a web-based interface, mobile interface, application interface, and/or executable program interface.

The external server may store relevant information and data in one or more external databases. In some instances, such relevant information and data can include user information data and distributed database information data. One or more template standards may be stored and accessed from the one or more external databases coupled to the external server.

A server (e.g., external server) may include a web server, an enterprise server, or any other type of computer server, and can be computer programmed to accept requests (e.g., HTTP, or other protocols that can initiate data transmission) from a computing device (e.g., user device, other servers) and to serve the computing device with requested data. In addition, a server can be a broadcasting facility, such as free-to-air, cable, satellite, and other broadcasting facility, for distributing data. A server may also be a server in a data network (e.g., a cloud computing network).

A server may include various computing components, such as one or more processors, one or more memory devices storing software instructions executed by the processor(s), and data. A server can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers. In some instances, the external server 105 may support code editing.

The one or more external databases may utilize any suitable database techniques. For instance, structured query language (SQL) or "NoSQL" database may be utilized for storing data. Some of the databases may be implemented using various standard data-structures, such as an array, hash, (linked) list, struct, structured text file (e.g., XML), table, JavaScript Object Notation (JSON), NOSQL and/or the like. Such data-structures may be stored in memory and/or in (structured) files. In another alternative, an object-oriented database may be used. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. Also, the database may be implemented as a mix of data structures, objects, and relational structures. Databases may be consolidated and/or distributed in variations through standard data processing techniques. Portions of databases (e.g., tables) may be exported and/or imported and thus decentralized and/or integrated.

The decentralized computer network 101 may communicate with one or more local devices 103 (e.g., local computer, user computer, etc.). In some cases, the decentralized computer network 101 may communicate with a large number of computer terminals of a large plurality of different users or entities. A user device may correspond to a node in the database of decentralized computer network 101. A user device may be a computing device configured to perform one or more operations consistent with the disclosed embodiments. For example, the user devices 103 may interact with the distributed database of the decentralized computer network 101 by requesting and obtaining data via the network 110. A user device 103 may be used to broadcast a blockchain transaction, such as a token issuance transaction, smart contract issuance transaction, user creation transaction, and/or token transfer transaction. A user device may be used to store data in the distributed database of decentralized computer network 101. In another example, a user device may be used to access a user interface. For example, the user interface may create, modify, or otherwise access a token standard and/or smart contract via the user interface. A graphical user interface may include graphical elements such as buttons or other user indicators that may be selected by the user using a mouse, keyboard, other user control device, or a bodily part or other tool (e.g., for GUIs supported on a touch-sensitive display) for inputting data or otherwise viewing outputs and other intermediary visualizations.

Examples of user devices may include, but are not limited to, mobile devices, smartphones/cellphones, tablets, personal digital assistants (PDAs), laptop or notebook computers, desktop computers, media content players, television sets, video gaming station/system, virtual reality systems, augmented reality systems, microphones, or any electronic device configured to enable the user to visualize data or other outputs, for example. The user device may be a handheld object. The user device may be portable. The user device may be carried by a human user. In some cases, the user device may be located remotely from a human user, and the user can control the user device using wireless and/or wired communications.

The user device may include a communication unit, which may permit the communications with one or more other components in the decentralize computer network 101. In some instances, the communication unit may include a single communication module, or multiple communication modules. In some instances, the user device may be capable of interacting with one or more components in the network environment using a single communication link or multiple different types of communication links.

A user device may include one or more processors that are capable of executing non-transitory computer readable media that may provide instructions for one or more operations consistent with the disclosed embodiments. The user device may include one or more memory storage devices comprising non-transitory computer readable media including code, logic, or instructions for performing the one or more operations.

In some embodiments, users may utilize the one or more user devices to interact with the external server by way of one or more software applications (i.e., client software) running on and/or accessed by the user devices, wherein a user device 103 forms a client relationship with the external server. For example, the user device, such as a local computer, 103 may run dedicated mobile applications associated with the external server and/or utilize one or more browser applications to access external server's interface. In turn, the external server may deliver information and content to the user device 103 related to the distributed database of the decentralized computer network 101, for example, by way of one or more web pages or pages/views of a mobile application. As described elsewhere herein, the user device 103 may include several user devices that communicate amongst each other to form nodal relationships (e.g., as opposed to specific client-server relationships) within the computer system 100.

In some embodiments, the client software (i.e., software applications installed on the local device 103) may be available either as downloadable mobile applications for various types of mobile devices. Alternatively, the client software can be implemented in a combination of one or more programming languages and markup languages for execution by various web browsers. For example, the client software can be executed in web browsers that support JavaScript and HTML rendering, such as Chrome, Mozilla Firefox, Internet Explorer, Safari, and any other compatible web browsers. The various embodiments of client software applications may be compiled for various devices, across multiple platforms, and may be optimized for their respective native platforms.

The local device may include a display. The display may be a screen. The display may or may not be a touchscreen. The display may be a light-emitting diode (LED) screen, OLED screen, liquid crystal display (LCD) screen, plasma screen, or any other type of screen. The display may be configured to show a user interface (UI), such as a graphical user interface (GUI) rendered through an application (e.g., via an application programming interface (API) executed on the user device). The GUI may show graphical elements that permit a user to view a visualization of the token standard, the smart contract, and the like. The GUI may also allow a user to provide inputs and view outputs. In some instances, the UI may be web-based. For example, the local device may also be configured to display webpages and/or websites on the Internet.

In some cases, the system environment may comprise a cloud infrastructure. One or more virtual systems such as Docker systems may be utilized in the network for allowing the multiple users or user devices to interact. In such cases, each user device can be considered to be a processing environment that is being used by a manager/participant as part of a financial activity, for example. The plurality of user devices may comprise heterogeneous thin or thick client platforms (e.g., mobile phones, laptops, and PDAs). For example, the user device may allow one or more users to access applications through either a thin client interface, such as a web browser or program interface. The plurality of user devices may comprise any general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, distributed cloud computing environments that include any of the above systems or devices, and the like.

User devices may be associated with one or more users. In some embodiments, a user may be associated with a unique user device. Alternatively, a user may be associated with a plurality of user devices. A user as described herein may refer to an individual or a group of individuals or any user who is interacting with the distributed database of the decentralized computer network 101.

The one or more communication networks 110 may be a set of communication pathways between the user devices (e.g., local computers) 103, and other components of the communication network. A communication network may comprise any combination of local area and/or wide area networks using both wireless and/or wired communication systems. For example, the communication network may include the Internet, as well as mobile telephone networks. In one embodiment, the network uses standard communications technologies and/or protocols. Hence, the network may include links using technologies such as Ethernet, 802.11, worldwide interoperability for microwave access (WiMAX), 2G/3G/4G or Long Term Evolution (LTE) mobile communications protocols, Infra-Red (IR) communication technologies, and/or Wi-Fi, and may be wireless, wired, asynchronous transfer mode (ATM), InfiniBand, PCI Express Advanced Switching, or a combination thereof. Other networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), and the like. The data exchanged over the network can be represented using technologies and/or formats including image data in binary form (e.g., Portable Networks Graphics (PNG)), the hypertext markup language (HTML), the extensible markup language (XML), etc. In addition, all or some of links can be encrypted using conventional encryption technologies such as secure sockets layers (SSL), transport layer security (TLS), Internet Protocol security (IPsec), etc. In another embodiment, the entities on the communication network can use custom and/or dedicated data communications technologies instead of, or in addition to, the ones described above. The network may be wireless, wired, or a combination thereof.

Users running the decentralized computer network 101 are called miners or validators. This group of users runs consensus protocols, such as proof or work, proof of stake, delegated proof of stake, (practical) byzantine fault tolerance and others, to maintain consensus over the state of the blockchain. The decentralized computer network keeps track of the creation of cryptographic coins as well as their transfer from user to user.

Some blockchains store coins in data structures called unspent transaction outputs (UTXO). In such UTXO-type blockchains, each UTXO contains a function called a spending condition. In a UXTO-type blockchain platform, the decentralized computer network would implement a protocol guaranteeing that a system user can only send the coins to another UTXO if the sender can provide an input that satisfies the spending condition. To send coins, a sender would create a data structure called a transaction (a request) that includes two lists: the first list of inputs, each specifying which UTXO to send from and a parameter to the spending condition. The second list includes information enabling creation of new UTXO that contain the coin(s) being sent.

Spending conditions are encoded using a scripting language, which may either be Turing-complete or not Turing-complete ("Turing-incomplete.")

If a system uses a Turing-complete scripting language, it could become susceptible to an attack in which a malicious user broadcasts a transaction with a non-terminating spending condition. Every miner has to execute all spending conditions in the blockchain to ensure that a transaction is only included in the blockchain if the parameters in the inputs satisfy the respective spending conditions. If the scripting language used for defining spending conditions is Turing-complete, however, a miner checking such malicious output may be caught in a non-terminating computation. As a result, the entire network may become unresponsive, and a hard fork would be required to remove the malicious transaction from the blockchain.

One prior art approach for avoiding such an attack, while using a Turing-complete scripting language, is to implement an Ethereum-type blockchain platform, which charges a user for every computational step in the spending condition. This makes non-terminating computation infinitely expensive to the attacker and, therefore, impractical. However, a lot of record keeping is required to make this approach to building blockchains work: a second token, called "gas," is needed with which users pay the miners for performing the computation; two kinds of accounts (externally owned accounts and contract accounts) are needed as opposed to one kind used in a UTXO-based blockchain discussed below (private-public key pairs)); four different types of data structures (state trie, storage trie, transaction trie, recipes trie) are needed as opposed to one in UTXO-based model (the blockchain). This complexity makes it hard to reason about the system, which in turn makes it difficult and costly to develop secure applications. For example, even experienced programmers may have difficulty writing secure smart contracts in a Ethereum-type blockchain, which can result in security breaches and hacks.

Another drawback of the Ethereum-type blockchain platform is the cost of running smart contracts on it. This is because all miners need to perform every computation redundantly. Here, miners communicate through a byzantine fault tolerant protocol which adds extra overhead. Overall, running a computation on Ethereum is roughly 1,000,000 times more expensive than the same computation on consumer hardware.

At the same time, existing prior art systems using Turing-incomplete scripting languages, while not being susceptible to the type of an attack described above, have their own drawbacks. For example, an approach called UTXO-based blockchain uses a scripting language that cannot express all possible spending conditions, limiting the use of UTXO-based blockchains in real world applications.

Some advanced applications on top of UTXO-type blockchains use an approach called colored-coin approach. Colored-coin-based protocols typically support a class of smart contracts called "tokens" that can be used to generate digital entities that are scarce: new tokens can only be created under predefined conditions, making their duplication difficult and very costly.

The idea is to record meta data about token creation and token transfer transaction. Each colored-coin protocol is accompanied by a documentary standard (specification) that defines a fixed set of valid token creation and token transfer transactions. Users can broadcast these standardized transactions to create a provenance trail of token transfer events. The documentary specifications define ways in which transactions can or cannot be combined. For example, to achieve scarcity, a specification may prohibit a token transfer transaction that creates more tokens than it consumes.

Miners are unaware of the colored-coin standard being used and include a token transaction without checking its validity with respect to the standard. Although this has the advantage of miners not being required to do any additional computational work, the disadvantage is that users cannot assume that tokens recorded on a blockchain are valid. What allows this type of system work, however, is that the blockchain contains enough information to enable a user to determine the token's validity. To do so, for every token the user is offered, the user checks the history of token transfers. If the history contains only valid transfers, then the token is deemed valid and can safely be accepted.

Although the colored-coin approach provides enhanced security and reliability, it has at least two drawbacks. The first drawback is a lack of expressiveness. For example, while most colored-coin protocols support data structures that are mappings from user IDs to basic data types (such as numbers, strings, Booleans), they do not support operations on complex (non-basic) data structures.

The second drawback of colored-coins protocols is their limiting of permitted data updates. Each colored-coin standard supports a fixed set of about a handful of token creation and transfer types. This precludes applications requiring a different kind of data updates. As a result, although the colored-coin approach has its advantages, it works only for a small number of applications.

Accordingly, there is a need for a protocol for smart contracts that overcomes the disadvantages of the prior art, such as the Ethereum protocol and the colored-coin protocol.

For example, there is a need for a blockchain protocol that supports every computational token transfer type on UTXO-based blockchains.

There is also a need for an alternative semantic protocol that enables storing a history of computations on a UTXO-based blockchain for any object-oriented computer language, such as the Classroom Object-Oriented Language ("COOL"). This history can be used for audit purposes and/or for proving properties of a system to an outside observer.

There is also a need for cryptocurrency approach that works on non basic, nested data structures independent of the consensus algorithm used.

There is also a need for a method and system for storing and updating on a UTXO-based blockchain platform non-basic data structures. Particularly, there is a need for a method and system for storing and updating on such UTXO-based blockchain platform non-basic, nested data structures. More particularly, there is a need for a method and system for storing and updating non-basic, nested data structures on UTXO-based blockchain platforms.

Recognized herein is a need for systems and methods for digital token (which is a particular kind of smart contracts) implementations on various distributed database structures that address at least the above mentioned problems and objectives.

SUMMARY

The present invention overcomes the problems of the prior art. For example, whereas each colored coin standard supports a fixed set of supported token transfer types, the present invention supports every computable transfer type. Instead of standards documents, the invented system uses object-oriented programs as specifications. For a given object-oriented language, we define an alternative semantics that stores a trace of a computation on a blockchain. Traces can be valid or invalid, but like in the colored coins approach, miners are unaware of the meaning of the trace and will include transactions encoding invalid traces. However, also as in the colored coin approach, a user will be able to determine from information on the blockchain whether the trace is valid. If the trace is valid it can be used to compute a value.

In the same way that colored coins store tokens in UTXOs, the approach of present invention stores the current state of a computation in multiple utxos. Values can be updated by executing function calls. Each function call corresponds to a transaction that intuitively speaking spends the output storing the old value into an output storing a new value. The spending condition of the utxo restricts who can call a function that updates the value in the utxo. This naturally induces a notion of data ownership where only the owner of some data has permission to update the value. A new owner can be assigned by calling a function. Additionally, coins can be stored together with a value in an utxo and these coins can be transferred from user to user via function calls in the same way that the date is updated.

In Ethereum, miners provide consensus over the value of a computation. Miners in Bitcoin cannot do that, but they do provide consensus over the state (for example who owns how many coins). In the present invention, a trace pf the configurations of the computation are stored. Users can analyze a trace and gain consensus over the value of the computation. This makes the invented system trustless.

The present invention has the following advantages:

Smart contracts can be built on top of utxo based blockchains. Despite the fact that these represent a majority of cryptocurrencies, currently, no other general-purpose, Turing complete, smart contract solution exists for either of them.

Existing object-oriented programming languages can be turned into smart contract languages without introducing new syntactic features. The inventions thereby adds smart contract capabilities to existing ecosystems of developers, tools, and theoretical underpinnings that have been developed by large communities over many years.

Like in the colored coins approach, computational work is performed by the users and not by the miners. This leads to immense cost-saving, because of the high cost of performing computation by miners, where as the electricity cost for performing a computation on a local computing device can be considered negligible for most applications (users "pay" with their time).

All previous states of a system can be recovered from the blockchain. All updates are time-stamped and cryptographically signed. This information can be used to audit a system in hindsight.

The system allows multiple users to manipulate the same data without requiring trust between the users. This makes it easy to build applications that span multiple organizations. It also makes it possible for service providers to guarantee properties of their service to their users.

The present invention provides method of generating an instruction in a first object-oriented computer language for operating in a decentralized computer network from an instruction in a second object-oriented computer language that can operate on a local (centralized) computer, where a semantic of the second object-oriented computer language can be expressed by a rule so, S, E, ⊢e: v, S' □□with ⊢ denoting a semantic relation said rule meaning that in a context where a variable self refers to an object so, where a data store on the centralized computer is S, and where an execution environment is E, an expression e evaluates to an object v at a second data store S' in the centralized computer, the method comprising: replacing a centralized (local) storage update command S[v/l], which updates an at least one location l by an object v, by a command to (a) broadcast to the decentralized computer network an at least one transaction that spends at least one unspent-transaction-output corresponding to said location l into a new output that stores at least one of (i) said object v and (ii) information enabling said object v to be determined; and (b) spending at least one additional unspent-transaction-output corresponding to a second location l' in said execution environment E or said object so, wherein said generated instruction enables operation of a smart contract.

The present invention further provides that the instruction in said first object-oriented computer language is a storage-update instruction, and wherein said storage-update instruction either immediately precedes a recursive call to a first semantic relation or is located at an end of a body of said semantic rule of said first object-oriented computer language.

The present invention further provides that the instruction in said first object-oriented computer language is an instruction for storing a data structure D at an unspent memory location OUT on the decentralized computer network, said data structure D further including a data structure D', where said data structure D' further includes a data structure D", said method comprising the steps of:

(a) receiving at the local computer a request to store the data structure D at an unspent memory location OUT on the decentralized computer network;

(b) creating at the local computer a request TX, to the decentralized computer network, to spend the unspent memory location OUT and to generate a new unspent memory location OUT' on the decentralized computer network;

(c) using the local computer to sign and broadcast said request TX to the decentralized computer network;

(d) receiving said request TX at the decentralized computer network;

(e) using the decentralized computer network to determine validity of said request TX according to a protocol of the decentralized computer network; and (f) if said request TX is determined to be valid, performing the steps of (i) spending the unspent memory location OUT on the decentralized computer network and generating said new unspent memory locations OUT' on the decentralized computer network; and (ii) repeating steps (a) through (f)(i) above while using said data structure D' in place of said data structure D and while using said memory location OUT' in place of said memory location OUT.

The present invention further operation on a decentralized computer network that is an unspent-transaction-outputs blockchain.

The present invention further enables a source code of a program written in one of said first computer language and said second computer language to be stored in a transaction, for example an object creation transaction.

The present invention provides a computer system comprising a local computer, the local computer comprising:

a) a memory for storing computer instruction and data; and b) a processor operatively coupled to said memory, said processor capable of generating an instruction in a first object-oriented computer language for operating in a decentralized computer network from an instruction in a second object-oriented computer language that can operate on the local computer, where a semantic of the second object-oriented computer language can be expressed by a rule so, S, E, ⊢e: v, S' with ⊢ denoting a semantic relation said rule meaning that in a context where a variable self refers to an object so, where a data store on the local computer is S, and where an execution environment is E, an expression e evaluates to an object v at a second data store S' in the local computer, said method comprising: replacing a centralized storage update command S[v/l], which updates an at least one location l by an object v, by a command to (a) broadcast to the decentralized computer network an at least one transaction that spends at least one unspent-transaction-output corresponding to said location l into a new output that stores at least one of (i) said object v and (ii) information enabling said object v to be determined; and (b) spending at least one additional unspent-transaction-output corresponding to a second location l' in said execution environment E or said object so; wherein said generated instruction enables operation of a smart contract.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
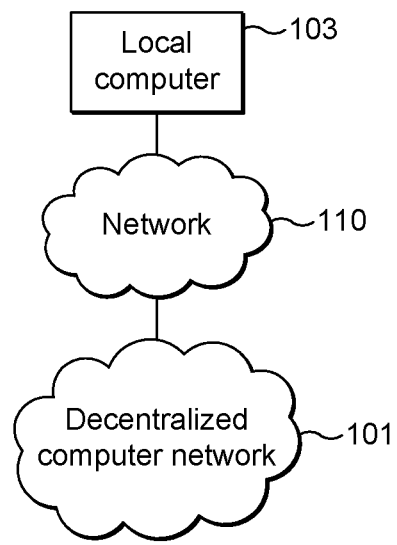
FIG. 1 is a computer system in accordance with some embodiments of the present invention.
Figure 2:
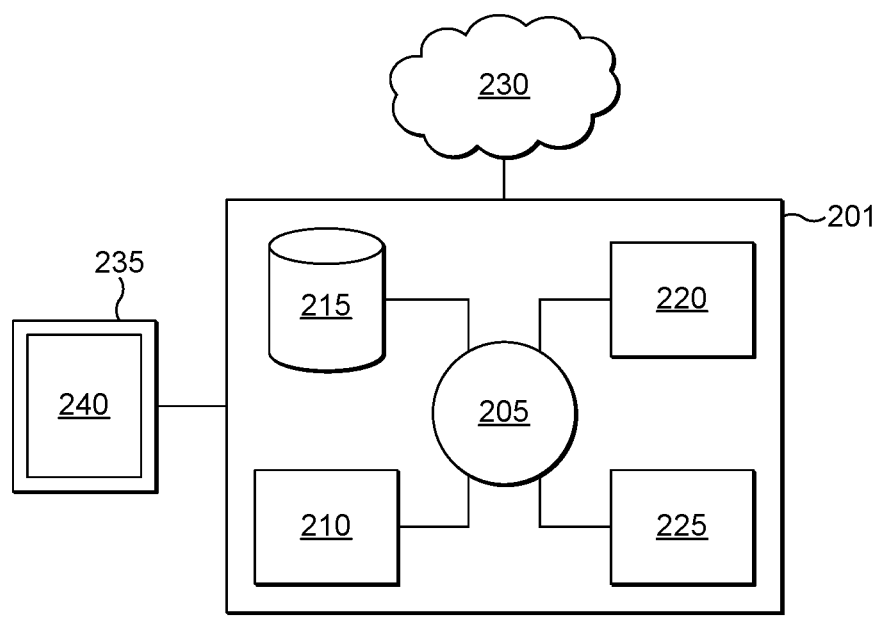
FIG. 2 shows a computer on a decentralized computer network in accordance with some embodiments of the present invention.

Skilled artisans will appreciate that elements in the figures are illustrated for simplicity and clarity. The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the present invention. A person skilled in the art, however, will understand that the present invention in not limited to the specific disclosed embodiments, and that other embodiments are within the scope of the present invention.

Although the present invention can work with any object-oriented programming language, one exemplary embodiment implements the invention using a UXTO-type blockchain and a simple object-oriented language called Classroom Object-Oriented Language ("COOL").

A UXTO-based cryptocurrency has two elements: a data structure called a blockchain and a consensus algorithm that is used to update the blockchain. The present invention is independent of the consensus algorithm used and can operate on all UTXO-based blockchains regardless of the consensus protocol used.

In one embodiment of the present invention, a blockchain B includes a set of transactions (requests issued to a distributed computer network), where a transaction consists of a list of inputs ins and a list of outputs outs. Each transaction (request) tx and each output out in a blockchain B has a unique identifier denoted by Id(tx, B) and Id(out, B), respectively. Given an identifier id of an object, B(id) denotes the object in the blockchain B, therefore B(Id(tx, B))=tx and B(Id(out, B))=out.

Below is an exemplary expression for a transaction tx having a number of inputs ins and outputs outs.
tx={
  ins: [{$oId_1$, ?$params_1$}, . . . , {$oId_n$, ?$params_n$}]
  outs [{$condition_1$, $amount_1$, ?$data_1$}, . . . {$condition_m$, $amount_m$, ?$data_m$}]
}

An input in B stores the id of an output in B in a field called $oId_i$ and may also store an array of parameters in a filed called params. A transaction tx is considered signed if each one of its inputs contains an array of parameters; considered partially signed if some inputs have parameters; and considered unsigned if no input contains parameters.

Given a transaction tx, copy(tx) denotes the unsigned transaction that is obtained from tx by removing all parameters from the transaction's inputs.

An output includes a function condition that maps parameters to a Boolean, a number of coins called amount, and optionally some data.

A partial function that maps a transaction and an n-ary spending condition to an array of n-1 parameters may be referred to as a wallet W. W can sign an input {oId: B(out)} of a transaction tx if copy(tx) and the condition $c_{out}$ of the output out that is being spent are in the domain of W. For example, $sign_W$(tx) denotes the transaction obtained from tx by replacing every unsigned input {oId: B(out)} that W can sign by {oId: B(out), params: W(copy(tx), $c_{out}$)}.

For example, the expression below describes the process of signing a transaction tx, in which a wallet W can sign the first but not the second input of tx. The first input of tx references an output $out_0$ with spending condition c. The unsigned transaction copy(tx) is obtained from tx by removing a parameter sig from the second input. $sign_W$(tx) has sig added back as the parameter of the second input and W(copy(tx), c) is added as the parameter of the first input.
$out_0$={amount: . . . , condition: c}
$tx_0$={ins: . . . , outs: [$out_0$]}
tx={ins: [{oId: Id($out_0$, B)}, {oId: . . . , params: [sig]}], outs: . . . }
copy(tx)={ins: [{oId: Id($out_0$, B)}, {oId: . . . }], outs: . . . }
$sign_W$(tx)={
  ins: [{outId: Id($out_0$, B), params: W(copy(tx), c)}, {oId: . . . params: [sig]}],
  outs: . . .
}

We can say that input in "spends" output out if in includes a reference to out. We can also say that a transaction tx "spends" an output out if the out is spent by an input of tx. We can say that a wallet W can "spend" from an output out with condition c if there is a transaction tx such that $$c(copy(tx), W(copy(tx), c)) = true$$

A blockchain B is valid if:
1. Every transaction tx in B is fully signed and has a unique id Id(tx, B).
2. If {oId: o, params: p} is an input in B, then B contains an output out such that B(o)=out.
3. If {oId: $o_1$, params: $p_1$} and { oId: $o_2$, params: $p_2$} are distinct inputs in B, then $o_1 \neq o_2$.
4 If {oId: o, params: p} is an input in B, then copy(tx) and p satisfy the condition B(o).
5. If a transaction tx in B has at least one input, then the sum of coins in the outputs of tx is not greater than the sum of coins in the outputs spent by tx.

A wallet can broadcast a unsigned transaction tx to a blockchain B if the expression B∪{$sign_W$(TX)} is valid.

A transaction with no inputs is called a coinbase transaction. Such a transaction creates new coins. Note that according to the definition in one preferred embodiment, any coinbase transaction is valid in any blockchain.

In real world blockchains, only distinguished users called miners are permitted to broadcast coinbase transactions.

In addition, the consensus protocol may impose further constraints on how frequently coinbase transactions can occur and how many coins they can create. Below is an example of a payment system that can be implemented using a blockchain of the present invention.

Let (gen, sign, verify) be a digital signature scheme. Let (pubKey, privKey) be a private-public key pair generated by gen( ). A transaction $TX_0$ that has one output out with a condition c that maps (x, y) to verify(x, pubKey, y). Let W be a wallet that maps (copy(tx), c) to [privkey, sign(privKey, copy(tx))] for every transaction tx.

$out_0$={condition: (x, y)=>verify(x, pubKey, y), amount:a}
$tx_0$={ins: . . . , outs: [$out_0$]}
tx={ins: [{outId: $Id_B$($out_0$)}], outs: . . . }
copy(tx)=tx
$sign_W$(tx)={ins: [{outId: Id($out_0$ B), params: [privKey, sign (privKey, copy(tx))]}], outs: . . . }

Because the expression below is true, tx is a witness that W can spend the output $tx_0$.

$$c(copy(tx), W(copy(tx), c)) = c(copy(tx), sign(privKey, copy(tx))) = verify(copy(tx), pubKey, sign(privKey, copy(tx))) = true$$

Although the present invention can operate with any object-oriented programming language, in one preferred embodiment, the present invention will be described in the context of the COOL programming language. COOL is a statically typed object-oriented language with a formally defined syntax and semantics that are described in "The Cool Reference Manual," which was authored by Alex Aiken in 1995, and the contents of which are hereby incorporated in full by reference. The syntax of Cool is similar to the syntax of existing object-oriented programming languages like Java or Javascript.

Cool programs are sets of classes written is a syntax that is similar to existing object oriented programming languages like Java or Javascript. For every program P, there are two functions that can be computed from the source code of P: the function class returns the attributes, types and initializations for a given class:

class(X)=($a_1$: $T_1 \leftarrow e_1$, . . . , $a_n$: $T_n \leftarrow e_n$)

The function implementation returns the parameters and body of a given method in a class:

implementation(X, m)=($x_1$, . . . , $x_n$, $e_{body}$)

Most constructs in Cool are expressions and every expression has a value. The basic expressions in Cool are integer constants like 1, 2, 3, strings like 'hello', and the Boolean values true and false. All values are objects in Cool. Values are defined with respect to a set of identifiers Ids and a set of locations Loc. Identifiers are atomic syntactic objects that can be used as variables. There are also special identifiers, like self. The values with identifiers Ids and locations in Loc (denoted $Val_{Ids, Loc}$) is the set containing void, Bool(b) for b∈{true, false}, Int(n) for integer n, String(l, s) for string s of length l, and elements of the form C($a_1$=$loc_1$, . . . , $a_n$=$loc_n$)

where C is a class name, $a_1$, . . . , $a_n$∈Ids, and $loc_1$, . . . , $loc_n$∈Loc.

Each value in Cool has a type. The type of an integer constant x is Int and its value is Int(x), and the same notation is used for strings and Booleans. The type of an object C(a=1) is C. Each type has a default value: the default $D_{Int}$ of Int is 0, the default $D_{string}$ of String is the empty string", the default $D_{Bool}$ of Bool is false, and the default of any other type is void.

As mentioned above, the set Ids of identifiers in a program always includes a special variable self that refers to the object on which a method was dispatched. We write Val instead of $Val_{Ids, Loc}$ when the set of ids and the set of locations are clear from the context.

The semantics of Cool is defined with respect to a partial function called environment E: Ids−>Loc and a partial function called store S: Loc−>Val. The operational semantics of Cool is defined by rules of the form so, S, E⊢e: v, S' where so is an object, E is an environment, S and S' are stores, e is an expression, and v is a value. The rule reads: In the context where the special variable self refers to the object so, the store is S, and the environment is E, the expression e evaluates to value v and the new store is S'.

Changes to the store and environment will be denoted using the following notation: Given a function F:D−>R and elements d, d'∈D and r∈R, we define F[r/d] to be a function such that R[r/d](d')=r if d=d' and F[r/d](d')=F(d') otherwise. To allocate memory, we need a way to obtain a new location from a store. Thus, we define newloc(S) to be a function that returns a location l∈Loc for a given store S, such that l is not in the domain of S.

The semantic rules of Cool that are relevant here are discussed below (the other rules can be found in Section 13 of the Cool manual, which is incorporated herein in its entirety). For the examples below, we fix an environment E and a store $S_1$.

Variable Assignment

The first step when evaluating Id←e in so, $S_1$, E, as defined above is to evaluate expression e to obtain its value v. The side effect of the evaluation is that the store $S_1$ is updated to a store $S_2$, however, $S_2$ might be identical to $S_1$. Next, the location E(Id) of Id is looked up in the environment. Finally, the store $S_2$ is updated to store value v at location l. The semantics rule [Assign] of the Cool semantics is shown below.

[Assign]
so, $S_1$, E⊢e: v, $S_2$
E(Id)=l
$S_3$=$S_2$[v/l]
so, $S_1$, E⊢Id←e: v, $S_3$ Variable Definition When an assignment let Id: T1←$e_1$ in $e_2$ is evaluated in so, $S_1$, E, the expression $e_1$ is evaluated to value $v_1$. Then a new location l is obtained $S_2$, and the value $v_1$ is stored at location l. Finally, the expression e2 is evaluated in the environment E'=E[l/id].

[Let]
so, $S_1$, E⊢e: v, $S_2$
l=newloc($S_2$)
$S_3$=$S_2$[v/l]
E'=E[l/Id]
so, $S_3$, E'⊢e': v', $S_4$
so, $S_1$, E⊢let Id: T←e in e': v', $S_4$ Object Construction When an expression new A is evaluated, the class $A_0$ to be constructed is determined (details of SELF_TYPE can be found in section 4.1 of the Cool manual, which is incorporated herein in its entirety). Next, distinct new locations $l_i$ are obtained from $S_1$ for every attribute $a_i$: $T_i$ of A and 1<=i<=n. Location ln is initialized to the default for type $A_i$. Finally, the expression $a_1 \leftarrow e_1$; . . . ; $a_n \leftarrow e_n$; is evaluated in an environment that contains the locations that store the attributes of $A_0$.

[New]
$A_0$=B if A=SELF_TYPE and so=B( . . . ) and $A_0$=A otherwise
class($A_0$)=($a_1$: $A_1 \leftarrow e_1$, . . . , $a_n$: $A_n \leftarrow e_n$)
$l_i$=newloc($S_1$), for i=1 n and each $l_i$ is distinct
$v_1$=$A_0$($a_1$=$l_1$, . . . , $a_n$=$l_n$)
$S_2$=$S_1$[$D_{A\_1}$/$l_1$, . . . $D_{A\_n}$/$l_n$]
$V_1$, $S_2$, [$a_1$: $l_1$, . . . , $a_n$: $l_n$]⊢{$a_1 \leftarrow e_1$; . . . ; $a_n \leftarrow e_n$;}: $v_2$, $S_3$
so, $S_1$, E⊢new A: $v_1$, $S_3$ Method Dispatch When an expression $e_0$.f($e_1$, . . . , $e_n$) is evaluated in the Cool semantics, the expressions $e_1$, . . . , $e_n$ that are passed as parameters are evaluated to the values $v_1, \ldots, v_n$, respectively. Then expression $e_0$ is evaluated to value $v_0$. Then one new location $k_{x\_i}$ is created and initialized to store $v_i$ for $1 <= i <= n$. Then the body $e_{n+1}$ of the method f is evaluated in an environment that contains the locations storing the attributes of the object $v_0$ on which the function was called, as well as the locations $l_{x\_1}, \ldots, l_{x\_n}$ that store the values of the parameters

[Dispatch]

so, $S_1$, E⊢$e_1$: $v_1$, $S_2$
so, $S_2$, E⊢$e_2$: $V_2$, $S_3$
...
so, $S_n$, E⊢$e_n$: $V_n$, $S_{n+1}$
so, $S_{n+1}$, E⊢$e_0$: $V_0$, $S_{n+2}$
$A(a_1=l_{a\_1}, \ldots, a_m=l_{a\_m})=V_0$
$(x_1, \ldots x_n, e_{n+1})$=implementation(A, f)
$l_{x\_i}$=newloc($S_{n+2}$), for i=1 ... n and each $l_{x\_i}$ is distinct
$S_{n+3}=S_{n+2}[V_1/l_{x\_1}, \ldots, V_n/l_{x\_n}]$
$V_0, S_{n+3}, [a_1: l_{a\_1}, \ldots, a_m: l_{a\_m}, X_1: l_{x\_1}, \ldots, x_n: l_{x\_n}]$⊢$e_{n+1}$: $V_{n+1}, S_{n+4}$
so, $S_1$, E⊢$e_0.f(e_1, \ldots, e_n)$: $V_{n+1}, S_{n+4}$ As mentioned above, the present invention can convert any object-oriented programming language into a smart contract version of that language. One embodiment of the invention described below converts the Cool programming language into a smart contract version of Cool, which will be referred to BCool programming language.

BCool

The syntax of an exemplary new programming language, BCool, is identical to the syntax of Cool. Before we define the semantics of BCool, however we fix some notation. Let tx be a transaction with inputs $[in_1, \ldots, in_n]$ and outputs $[out_1, \ldots, out_m]$. An output $out_i$ for which $n<i<=m$ is called a b-location. If $i<\min(n, m)$ then $out_i$ is the successor of the output out that is spent by $in_i$. In this case, out is the predecessor of $out_i$. An output out is a revision if its predecessor is a b-location or a revision. Output out is the latest revision of output out' if there are outputs $out_1, \ldots, out_n$ such that $out'=out_1$, $out_i$ is the predecessor of $out_{i+1}$ for all $1<=i<n$, $out_n=out$, and out is unspent.

Figure 3:
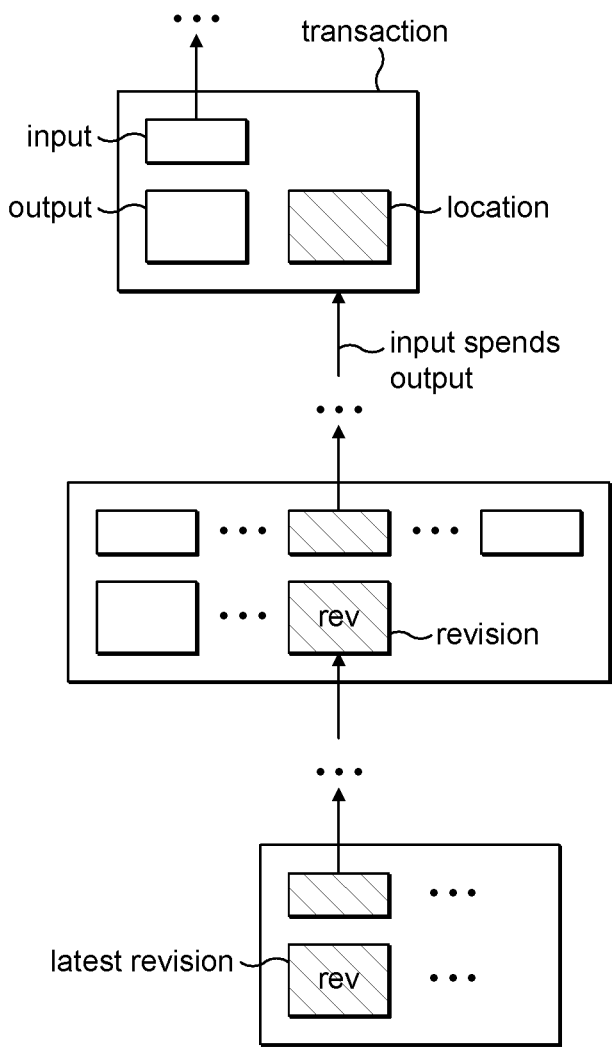
FIG. 3 is a diagram of the transactions that are broadcast when a location in the store of the decentralized computer is updated.

We define two functions that compute the revision and genesis for a given output.

rev(out, B)=out if out is unspent
rev(out, B)=rev(out', B) if out has a successor out'
rev(out, B)=undefined otherwise
loc(out, B)=out if out is a b-location
loc(out, B)=loc(out', B) if out has a predecessor out'
loc(out, B)=undefined otherwise This process is shown in FIG. 3. Specifically FIG. 3 is a diagram of the transactions that are broadcast when a location in the store of the decentralized computer is updated.

Values in BCool, analogous to Cool, are either of a basic type (String, Number, Boolean), void, or of the form $C(a_1=l_1, \ldots a_n=l_n)$ where C is a class name, $a_1 \ldots, a_n$ are the attributes of C and $l_1, \ldots,_n$ are b-locations.

Semantics of Bcool

Let B be a blockchain. A blockchain environment E for B is a mapping from identifiers to b-locations in B. The semantic rules of BCool are of the form so, B, E⊨e: v, B' where so is a value, B and B' are blockchains such that $B \subset B'$, E is a blockchain environment, e is an expression, and v is a value with b-locations in B.

One key distinguishing feature of the present invention, reflected in the exemplary language, BCool, is that it uses a blockchain instead of a store. Whenever an expression e is evaluated, a (possibly empty) set $T_e$ of transactions is broadcast to the blockchain. The BCool semantics uses distinguished outputs called b-locations that correspond to the locations in the Cool semantics. When a location loc is updated in Cool, the BCool semantics broadcast a transaction that spends the latest revision of the corresponding b-location into a successor that stores the new value.

We fix some notations for denoting reads from and writes to a blockchain. Let B be a blockchain and out an output in B. We define B(out) to be the value stored at the latest revision of output out, that is B(out)=v if rev(out) is of the form { data: { val: v } } and B(out) is undefined otherwise.

Writes are facilitated as follows. Let B be a blockchain, $R=\{l_1, \ldots, l_n\}$ a set of b-locations in B, and $U=\{l'_1 \to v_1, \ldots, l'_m \to v_m\}$ a mapping from b-locations in B to values such that $\{l_1, \ldots, l_n\}$ and $\{l'_1, \ldots, l'_m\}$ are disjoint. We define tx(B, U,R) to be a transaction that spends each location $l'_i$ with $1<=i<=m$ into a successor that stores the value $v_i$; tx(B, U, R) also spends the latest revision of each b-location $l_i$ with $1<=i<=n$ into a successor that stores the value stored at b-location in B:

```
tx(B,U,R) = {
  ins: [
    { old: rev(l_1, B) }, ..., { old: rev(l_n, B) },
    { old: rev(l'_1, B) }, ..., { old: rev(l'_m, B) },
  ]
  outs: [
    { data: { val: B(l_1) } }, ..., { data: { val: B(l_n) } },
    { data: { val: v_1 } }, ..., { data: { val: v_m } },
  ]
}
```

Given tx(B, U, R), an expression e, we define tx(B, U, R, e) to be the transactions obtained from tx(B, U, R) by adding expression e to the data of the first output.

Given blockchain B, we define b-newloc(B) to be a function that returns an unspent b-location from B. A unspent b-location can be generated by broadcasting a transaction with more outputs than inputs, so we assume that B contains sufficiently many unspent b-locations to perform a computation.

Given a blockchain environment $E=[a_1: l_1, \ldots, a_n: l_n]$ we denote by loc(E) the set of b-locations $\{l_1, \ldots, l_n\}$ that occur in E. Similarly, given value $v=(a_1=l_1, \ldots, a_n: l_n)$ we denote by loc(E) the set $\{l_1, \ldots, l_n\}$ Semantic Rules The semantic rules of BCool can be obtained from the semantic rules of Cool in a mechanical way. BCool has one rule [B-R] that is obtained from the rule [R] of Cool as follows:

Replace every symbol ⊢ for semantic relation of Cool with for semantic relation of BCool Replace every symbol Si denoting a centralized storage with a symbol Bi denoting a decentralized storage (blockchain)

Either before or after the store-update replacing step below, ensure that store updates always immediately precede recursive calls or are at the end of a rule body Replace every store update $S_i[v_1/l_1, \ldots, v_n/l_n]$ in the body of a rule for so, S, E⊢e: v, S' by a blockchain update that adds a transaction $\{tx(B_i,[v_1/l_1, \ldots, v_n/l_n], loc(E) \cup loc(so) \setminus \{l_1, \ldots, l_n\}, e\}$ to the blockchain Bi. In other words, replace every store update $S_i[v/l]$ that updates at least one location l in $S_i$ by value v, by the instruction to broadcast one or more transactions to the blockchain that spend at least one unspent-transaction-output ("utxo") corresponding to location l into a new output that stores a value v (or stores other meta information that allow v to be computed) and spend at least one additional utxo corresponding to a location in the current execution environment E (also referred to as stack frames) into a new output that stores the same value as its predecessor. Note, the first to bullets merely rewrite the symbols for notation convenience, as the symbol $B_i$ in the added transaction could be written as $S_i$.

The rewriting is trivial for rules that do not change the store. Therefore we omit the BCool rules that correspond (letter for letter) to the following Cool rules that do not change the store: [Var], [self], [True], [False], [Int], [String], [If-True], [If-False], [Sequence], [Loop-True], [Loop-False], [IsVoid-True], [IsVoid-False], [Not], [Comp], [Neg], [Arith].

The rules of the Cool semantics that change the store are [Assign], [Let], [New], [Dispatch], and [StaticDispatch]. Below we explain the rewritings of the first four rules in detail. We omit the rewriting of the rule [StaticDispatch] because it is almost exactly like the rule [Dispatch].

Figure 4:
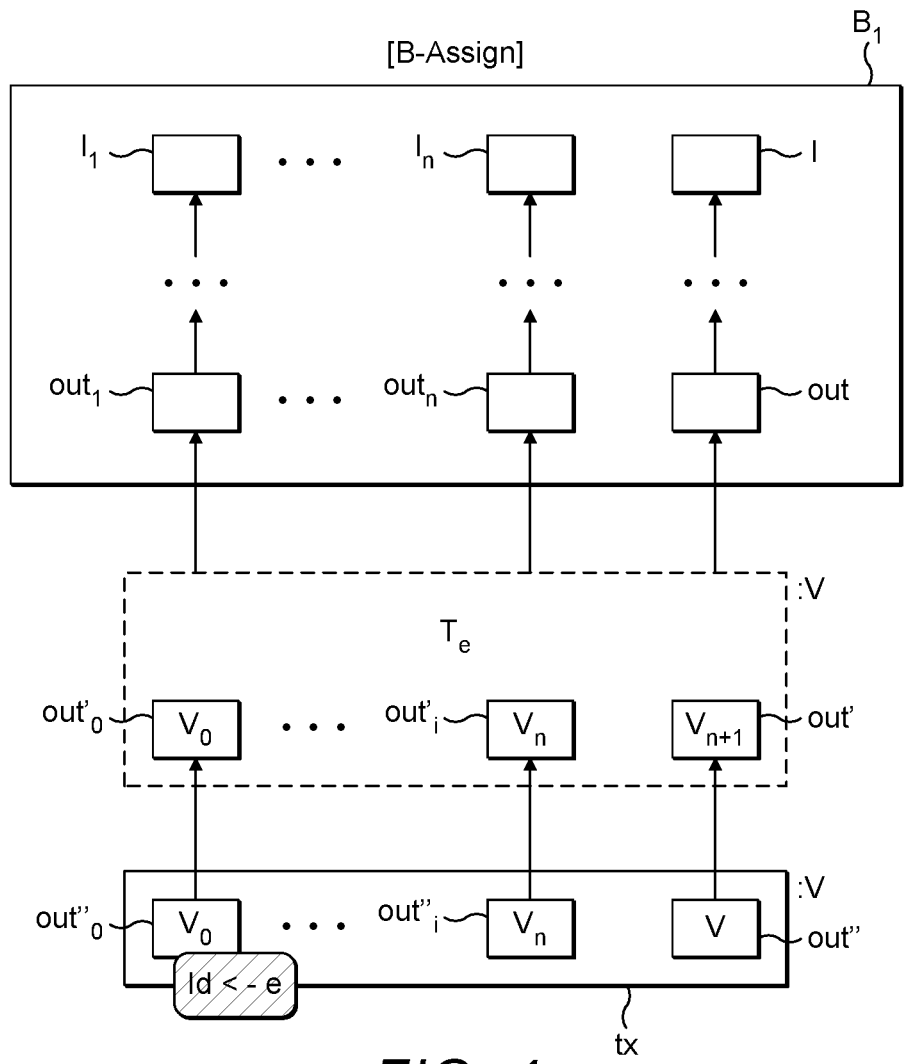
FIG. 4 is a diagram of the transactions that are broadcast when a variable assignment Id<–e is evaluated in a blockchain semantics in accordance with some embodiments of the present invention.

B-Assign
The semantic rule for variable assignment in BCool is as follows:
so, $B_1$, E⊨e: v, $B_2$
E(Id)=l
$B_3=B_2 \cup \{tx(B_2, [v/l], loc(E) \cup loc(so) \setminus \{l\}, Id \leftarrow e)\}$
so, $B_1$, E⊨Id←e: v, $B_3$ FIG. 4 shows the evaluation of Id←e with respect to object so, blockchain $B_1$, and environment E. In the figure, innermost boxes are either outputs or locations. Outputs are designated as $out_i$, $out'_i$, or $out''_i$ for some number i. Locations are designated with the letter l. The top most box labelled B1 represents a set of transactions containing the outputs inside the box labelled B1. Assume that $l_1, \ldots, l_n$, l are the b-locations that occur in either E or so, and that $out_1, \ldots, out_n$, out are the revisions of $l_1, \ldots, l_n$, l in $B_1$ respectively. Like in the semantics of Cool, the first step in the evaluation of Id←e is to recursively evaluate e. FIG. 4 shows the set of transactions in $T_e$ that is broadcast when e is evaluated. Transactions in $T_e$ spend the outputs $out_1, out_n$, out, thereby creating new revisions $out'_1, \ldots, out'_v, out'$. Then the transaction $tx=tx(B_2, [v/l], loc(E) \cup loc(so) \setminus \{l\}$, Id←e) is broadcast. This transaction spends the b-locations $loc(E) \cup loc(so) \setminus \{l\} = \{l_1, \ldots, l_n\}$ into outputs that store the same values as their predecessor. Transaction tx has one additional input-output pair that spends output out' into an output out" which in turn stores the value v obtained from evaluating e. The first output of tx also stores the expression Id←e.

Figure 5:
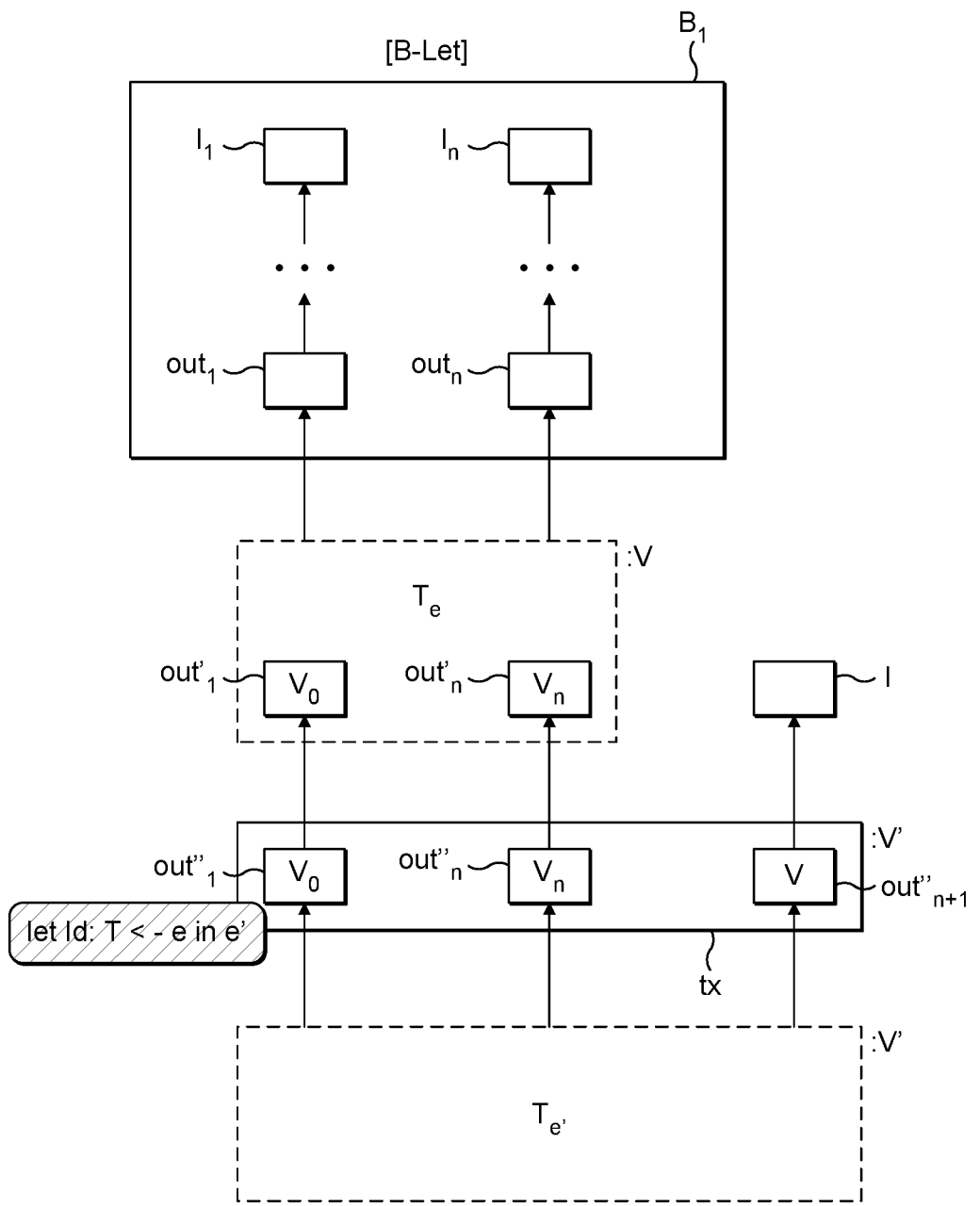
FIG. 5 is a diagram of the transactions that are broadcast when an expression of the form let Id: T<–e in e' is evaluated in a blockchain semantics in accordance with some embodiments of the present invention.

B-Let
the semantic rule for defining variables via let is as follows:
so, $B_1$, E⊨e: v, $B_2$
l=b-newloc(S2)
E'=E[l/Id]
$B_3=B_2 \cup \{tx(B_2, [v/l], loc(E') \cup loc(so), let\ Id: T \leftarrow e\ in\ e')\}$
so, $B_3$, E'⊨e': v', $B_4$
so, $B_1$, E⊨let Id: T←e in e': v', $B_4$ The evaluation of let Id: T←e in e' with respect to a value so, blockchain $B_1$, and environment E is shown in FIG. 5. Assume that $loc(E) \cup loc(so)=l_1, \ldots, l_n$ are b-locations in $B_1$ and that $out_1, \ldots, out_n$ are their revisions in $B_1$. When the evaluation starts in the first line of the rule of [B-Let], the expression e is evaluated and transactions $T_e$ are broadcast that create new revisions $out_1', \ldots, out_n'$, for the $l_1, \ldots, l_n$.

Next, a b-location l is obtained from $B_2=B_1 \cup T_e$. A blockchain environment E' is defined to be E[l/Id]. Then the transaction $tx(B_2, [v/l], loc(E') \cup loc(so)$, let Id: $T_1 \leftarrow e_1$ in $e_2$) is broadcast. The transaction spends the latest revisions of $l_1, \ldots, l_n$ into outputs $out''_1, \ldots, out''_n$ that store the same values as their predecessors. The transaction has one more input-output pair that spends b-location l into a successor that stores the value v.

In the last step, e' is evaluated in the environment E' that contains $l_1, \ldots, l_n$ form E but also the new location l. The value v' returned from evaluating e' is also returned from the evaluation of let Id: T←e in e'.

Figure 6:
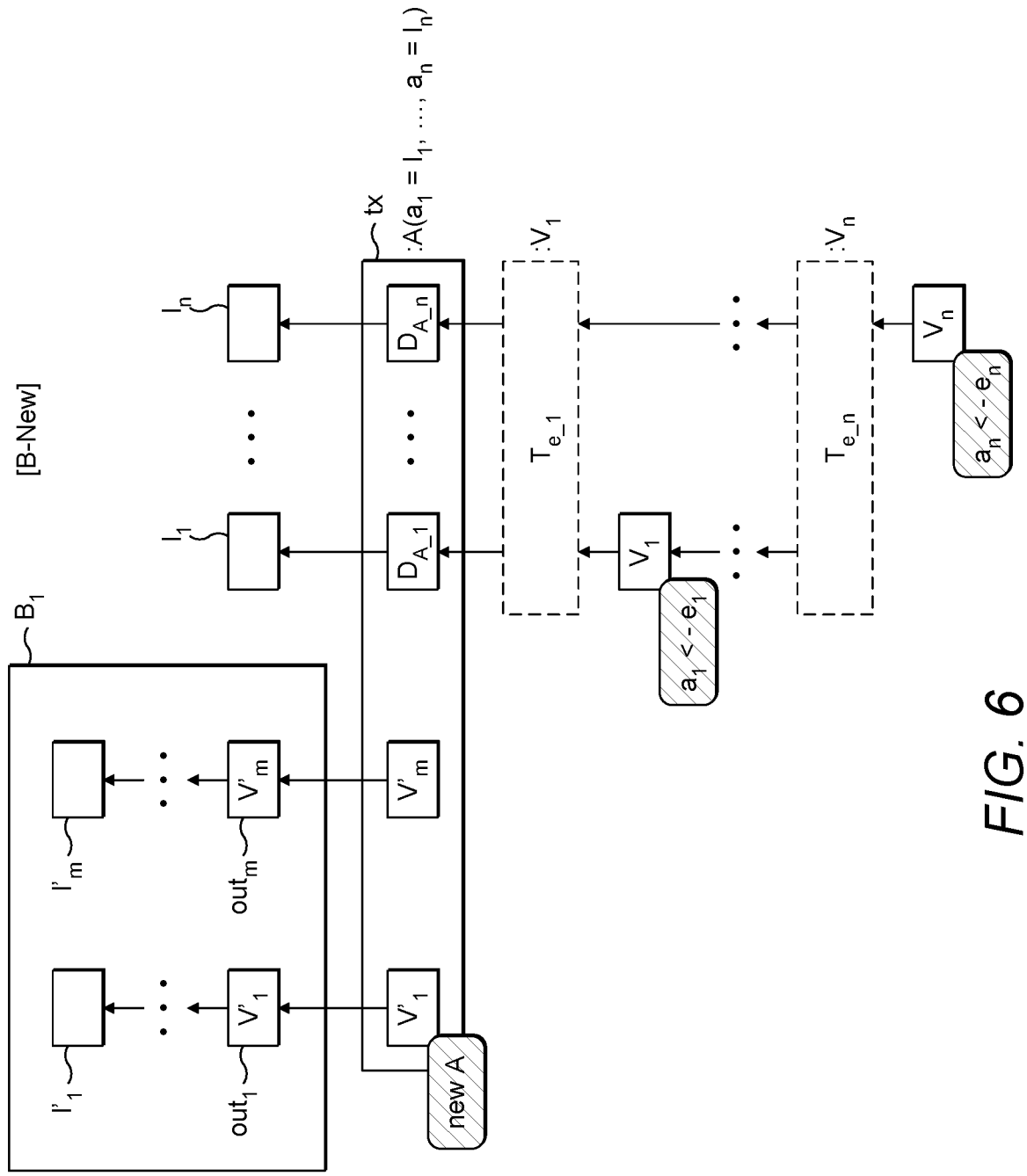
FIG. 6 is a diagram of the transactions that are broadcast when an expression of the form new A is evaluated in semantics in accordance with some embodiments of the present invention.

B-New
Next, we consider object creation in BCool.
$A_0$=C if A=SELF_TYPE and so=C( . . . ) and $A_0$=A otherwise
class($A_0$)=($a_1$: $A_1 \leftarrow e_1$, $a_n$: $A_n \leftarrow e_n$)
$l_i$=b-newloc($B_1$), for i=1, n and each $l_i$ is distinct
v=$A_0(a_1=l_1, \ldots, a_n=l_n)$
$B_2=B_1 \cup \{tx(B_1, [D_{A\_1}/l_1, \ldots, D_{A\_n}/l_n], loc(E) \cup loc(so) \setminus \{l_1, \ldots, l_n\}$, new A)$\}$
$v_1, B_2, [a_1: l_1, \ldots, a_n: l_n] \models \{a_1 \leftarrow e_1; \ldots; a_n \leftarrow e_n;\}$: v', $B_3$
so, $B_1$, E⊨new T: v, $B_3$ Let A be a class identifier such that class(A)=($a_1$: $A_1 \leftarrow e_1, \ldots, a_n$: $A_n \leftarrow e_n$). The evaluation of new A with respect to object so, blockchain $B_1$, and environment E is visualized in FIG. 6. When new A is evaluated, n unspent b-locations $l_1, \ldots, l_n$ are obtained from $B_1$. Assume that $loc(E) \cup loc(so) \setminus \{l_1, \ldots, l_n\} = \{l'_1, \ldots, l'_m\}$ and that { $out'_1, \ldots, out'_m$} are their revisions in $B_1$. When the transaction
$tx=tx(B_1, [D_{A\_1}/l_1, \ldots, D_{A\_n}/l_n], loc(E) \cup loc(so) \setminus \{l_1, \ldots, l_n\}$, new A)
is broadcast, the outputs $out'_1, \ldots, out'_m$ are spent into new outputs that store the same values as their predecessors. The fresh b-locations $l_1, \ldots, l_n$ are spent into outputs that store the defaults $D_{A\_1}, \ldots, D_{A\_n}$ of the types $A_1, \ldots, A_n$ of the attributes of A. Finally, each b-locations $l_i$ with 1<=i<=n is initialized to the value of $e_i$. First $e_1$ is evaluated in an environment that contains only the b-locations $l_1, \ldots, l_n$. This returns a value $v_1$ that is assigned to b-location $l_1$ as described in the section on [B-Assign]. This process is then repeated for each b-location $l_2, \ldots, l_n$ and expression $e_2, \ldots, e_n$. The value $A(a_1=l_1, \ldots, a_n=l_n)$ is returned from the evaluation of new A.

Figure 7:
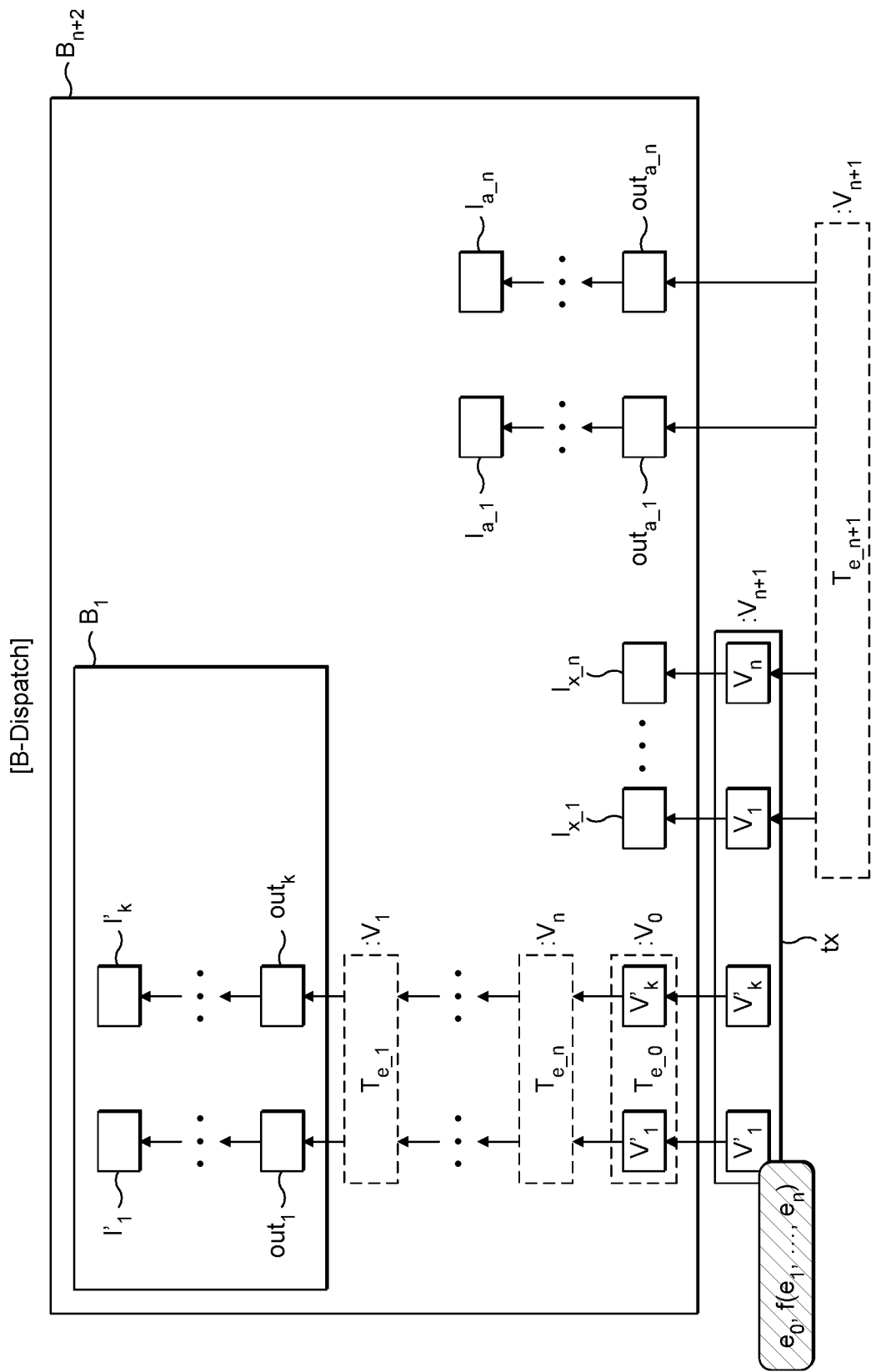
FIG. 7 is a diagram of the transactions that are broadcast when an expression of the form $e_0 f(e_0, \ldots, e_0)$ is evaluated in a blockchain semantics in accordance with some embodiments of the present invention.

B-Dispatch
Finally, the semantics of method dispatch is defined as follows:
so, $B_1$, E⊨e1: $v_1$, $B_2$
so, $B_2$, E⊨e2: $v_2$, $B_3$
. . .
so, $B_n$, E⊨en: $v_n$, $B_{n+1}$
so, $B_{n+1}$, E⊨$e_0$: $v_0$, $B_{n+2}$
$A(a_1=l_{a\_1}, \ldots, a_m=l_{a\_m})=v_0$
$(x_1, \ldots, x_n, e_{n+1})$=implementation(A, f)
$l_{x\_i}$=b-newloc($B_{n+2}$), for i=1, . . . ,n and each $l_{x\_i}$ is distinct
$B_{n+3}=B_{n+2} \cup \{tx(B_1, [v_1/l_{x\_1}, \ldots, v_n/l_{x\_n}], loc(E) \cup loc(so), e_0.f(e_1, \ldots, e_n))\}$
$v_0, B_{n+3}, [a_1: l_{a\_1}, \ldots, a_m: l_{a\_m}, x_1: l_{x\_1}, \ldots, x_n: l_{x\_n}] \models e_{n+1}$: $v_{n+1}, B_{n+4}$
so, $B_1$, E⊨$e_0.f(e_1, \ldots, e_n)$: $v_{n+1}, B_n+4$ FIG. 7 shows the evaluation of an expression $e_0.f(e_1, \ldots, e_n)$. As before, we consider the evaluation with respect to a blockchain $B_1$, environment E, and object so. We assume that $loc(E) \cup loc(so)=\{l'_1, \ldots, l'_k\}$ are b-locations and that $\{out'_1, \ldots, out'_k\}$ are their revisions in $B_1$. First, the expressions $e_1, \ldots, e_n$ are evaluated to values $v_1, \ldots, v_n$ in the environment E. Transactions $T_{e\_1} \cup \ldots \cup T_{e\_n}$ are broadcast which updates the blockchain to $B_{n+1}=B_1 \cup T_{e\_1} \cup \ldots \cup T_{e\_n}$. Then, expression $e_0$ is evaluated in $B_{n+1}$ which returns a value $v_0 = A(a_1=l_{a\_1}, \ldots a_m=l_{a\_m})$ and might broadcast further transactions $T_{e\_0}$.

Next, n unspent b-locations $l_{x\_1}, \ldots, l_{x\_n}$ are obtained from $B_{n+2}=B_{n+1} \cup T_{e\_0}$. Then the transaction tx=tx($B_1$, [$v_1/l_{x\_1}, \ldots, v_n/l_{x\_n}$], loc(E)$\cup$loc(so), $e_0$.f($e_1, \ldots, e_n$))

is broadcast. It spends the latest revisions of loc(E)$\cup$loc(so) (that is $l'_1, \ldots, l'_k$) into outputs that store the same value as their predecessor. The transaction also spends the unspent b-locations $l_{x\_1}, \ldots, l_{x\_n}$ into revisions that store the values $v_1, \ldots, v_n$. This first output of tx also stores the expression $e_0$.f($e_1, \ldots, e_n$). Finally, the body $e_{n+1}$ of the function f is evaluated to $v_{n+1}$ in a blockchain environment that contains the b-locations $l_{x\_1}, \ldots, l_{x\_n}$ and $l_{a\_1}, \ldots, l_{a\_m}$. The value $v_{n+1}$ is returned from the evaluation of $e_0$.f($e_1, \ldots, e_n$).

[B-Static-Dispatch]

The rule for static method dispatch is almost entirely like the rule [B-Dispatch] as shown below. The only difference is that in a normal dispatch, the class of this expression is used to determine the method to invoke; in static dispatch the class is specified in the dispatch itself so, $B_1$, E⊨$e_1$: $v_1$, $B_2$
so, $B_2$, E⊨$e_2$: $v_2$, $B_3$
...
so, $B_n$, E⊨$e_n$: $v_n$, $B_{n+1}$
so, $B_{n+1}$, E⊨$e_0$: $v_0$, $B_{n+2}$
$A(a_1=l_{a\_1}, \ldots, a_m=l_{a\_m})=v_0$
($x_1, \ldots, x_n, e_{n+1}$)=implementation(T, f)
$l_{x\_i}$=b-newloc($B_{n+2}$), for i=1, ..., n and each $l_{x\_i}$ is distinct
$B_{n+3}=B_{n+2} \cup \{tx(B_{n+2}, [v_1/l_{x\_1}, \ldots, v_n/l_{x\_n}], loc(E)\cup loc(so), e_0.f(e_1, \ldots, e_n))\}$
$v_0$, $B_{n+3}$, [$a_1: l_{a\_1}, \ldots, a_m: l_{a\_m}, x_1: l_{x\_1}, \ldots, x_n: l_{x\_n}$] ⊨ $e_{n+1}$: $v_{n+1}$, $B_{n+4}$
so, $B_1$, E⊨$e_0$@T.f($e_1, \ldots, e_n$): $v_{n+1}$, $B_{n+4}$

EXAMPLES

Following are several examples of the evaluation of BCool expressions.

Variable Definition and Assignment

Consider the expression e below consisting of two nested let expressions and an assignment.

let x←1
  in let y←2
    in xθy

Figure 8:
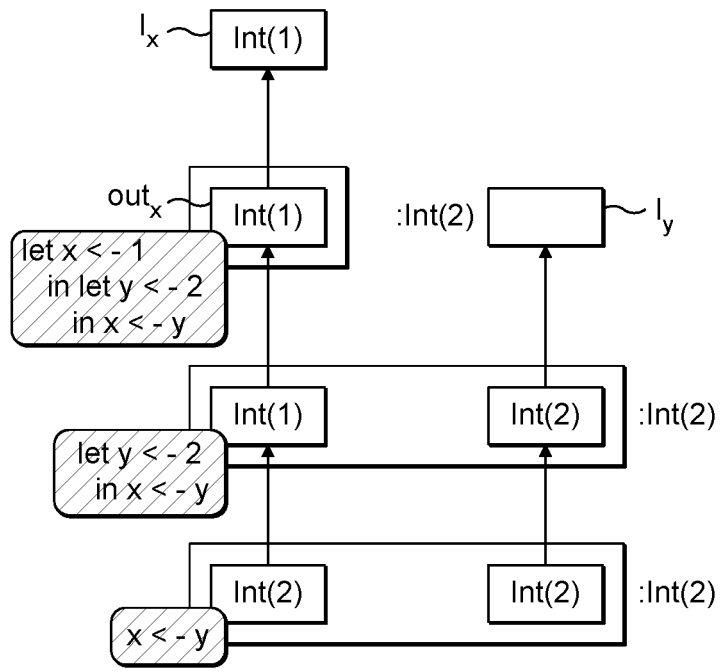
FIG. 8 is a diagram of the transactions that are broadcast when an expression let x<–1 in y<–2 in x<–y is evaluated in a blockchain semantics in accordance with some embodiments of the present invention.

The evaluation is shown in FIG. 8. The first step is to evaluate the expression 1. This evaluation broadcasts no transactions and returns the value Int(1). Then an unspent b-locations lx is obtained and a transaction is a broadcast that spends lx into an output that stores the value Int(1). The first output of this transaction stores the expression e.

Then the expression e'=let y←2 in x←y is evaluated in an environment that maps identifier x to location lx. In this evaluation, the first step is to evaluate the expression 2, which returns the value Int(2). A fresh location ly is obtained from the current blockchain. Then a transaction is broadcast that stores e' in its first output. This transaction spends lx because it is in the current environment and spends ly because it is the location created in e'.

Then the expression e'=let y←2 in x←y is evaluated in an environment that maps identifier x to location lx. In this evaluation, the first step is to evaluate the expression 2, which returns the value Int(2). A fresh location ly is obtained from the current blockchain. Then a transaction is broadcast that stores e' in its first output. This transaction spends lx because it is in the current environment and spends ly because it is the location created in e'.

In the final step, the assignment x←y is evaluated in the environment E=[x: $l_x$, y: $l_y$]. According to the rule for assignments, the expression y is evaluated first. As y is an identifier, no transactions are broadcast. Instead, the b-location $l_y$ for y is looked up in E and the value Int(2) that is stored in the latest revision of $l_y$ is returned. Control returns to the evaluation of x←y and a transaction is broadcast that spends the latest revisions of the b-locations in the current environment E. The outputs of this transaction update the value stored in $l_x$ to Int(2) and keep all other locations (only $l_y$ in this case) unchanged. This transaction stores x←y in its first output.

Object creation

Consider the program P below:

```
class A {
    num: Int
}
```

Figure 9:
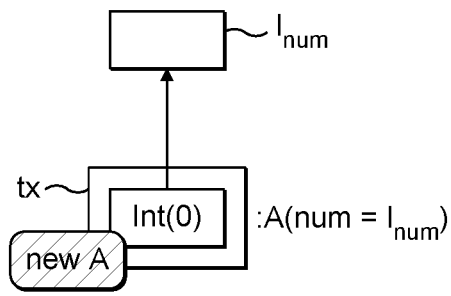
FIG. 9 is a diagram of the transactions that are broadcast when an expression new A is evaluated in a blockchain semantics in accordance with some embodiments of the present invention.

FIG. 9 shows the evaluation of new A. The first step is to obtain unspent b-locations for each attribute. In this example, there is only one attribute, num, and we denote its unspent b-location by $l_{num}$. Next, the location $l_{num}$ is initialized to the default value Int(0) for integers. This is achieved by broadcasting a transaction tx that spends $l_{num}$ into an output that stores the value Int(0) and the expression new ANext, consider the class B in the listing below.

```
class B {
    a1: A ← new A
    a2: A ← new A
}
```

Figure 10:
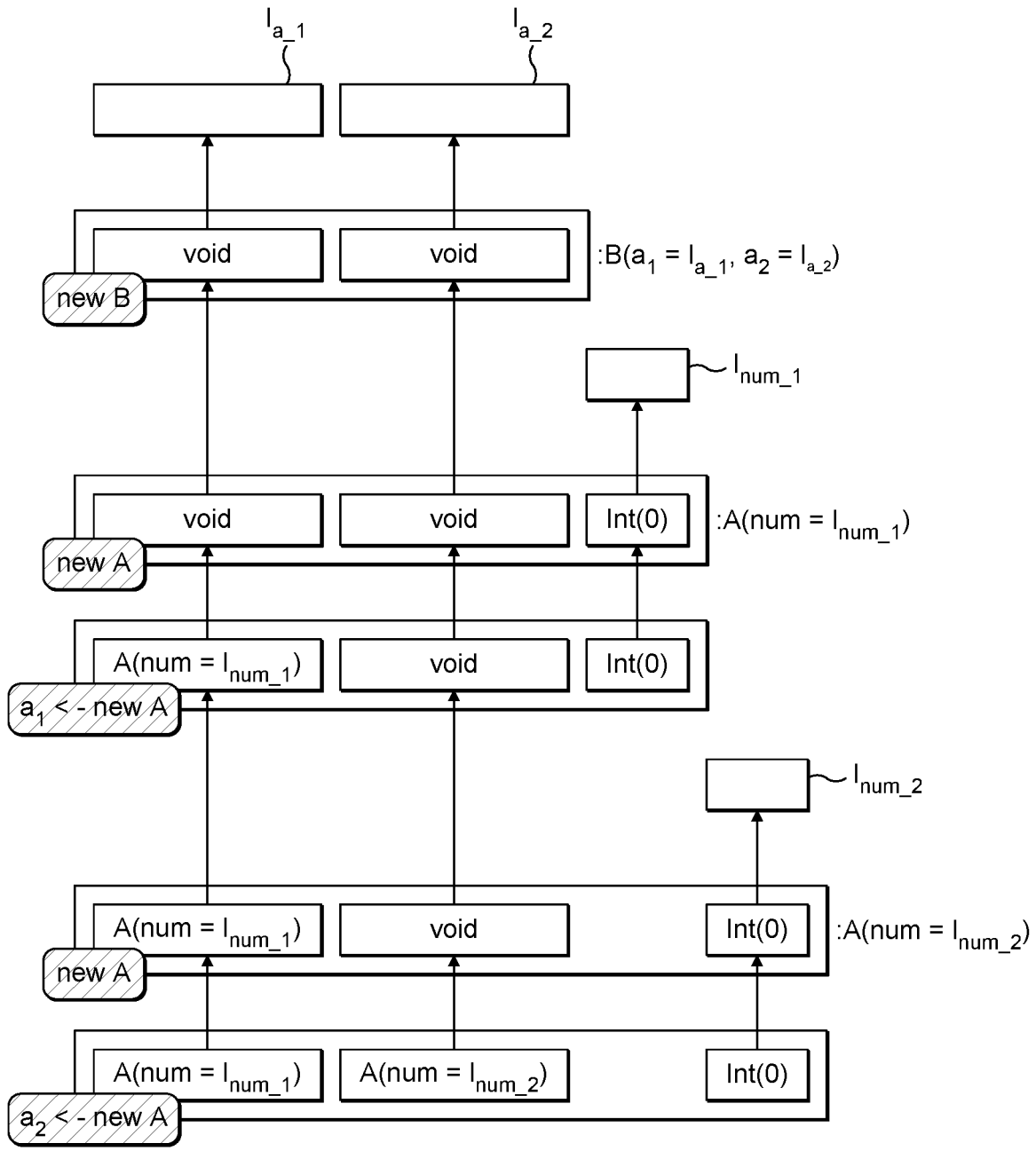
FIG. 10 is a diagram of the transactions that are broadcast when an expression new B is evaluated in a blockchain semantics in accordance with some embodiments of the present invention.

The evaluation of new B is shown in FIG. 10. In the first step, two unspent b-locations $la_{-1}$ and $la_{-2}$ are obtained from the blockchain. Both are initialized to void in the transaction that also stores the expression new B. The value returned is the object B($a_1=la_{-1}$, $a_2=la_{-2}$).

Next, the attributes $a_1$ and $a_2$ are assigned values. Both assignments are performed in an environment that contains $l_{a\_1}$ and $l_{a\_2}$. To assign a value to $a_1$ a new object of class A is created as described in the last example. As this object is constructed in an environment that contains other locations ($l_{a\_1}$ and $l_{a\_2}$ in this case), the latest revisions of $l_{a\_1}$ and $l_{a\_2}$ are spent as well. Next, the value A(num=$l_{num\_1}$) is assigned to the b-location $l_{a\_1}$ by the transaction that stores the expression $a_1$←new A.

Finally, the second attribute $a_2$ is initialized in the same way. The return value of the entire expression is B($a_1=l_{a\_1}$, $a_2=l_{a\_2}$)

Method Invocation

This final example shows how all four rules [B-Let], [B-Assign], [B-New], and [B-Dispatch] work together. Consider the following program:

```
class Counter {
    num: Int
    inc(x: Int): Int {
        num ← x
    }
}
```

The evaluation of the expression e below can be explained as follows let c←new Counter
in c.inc(1)

Figure 11:
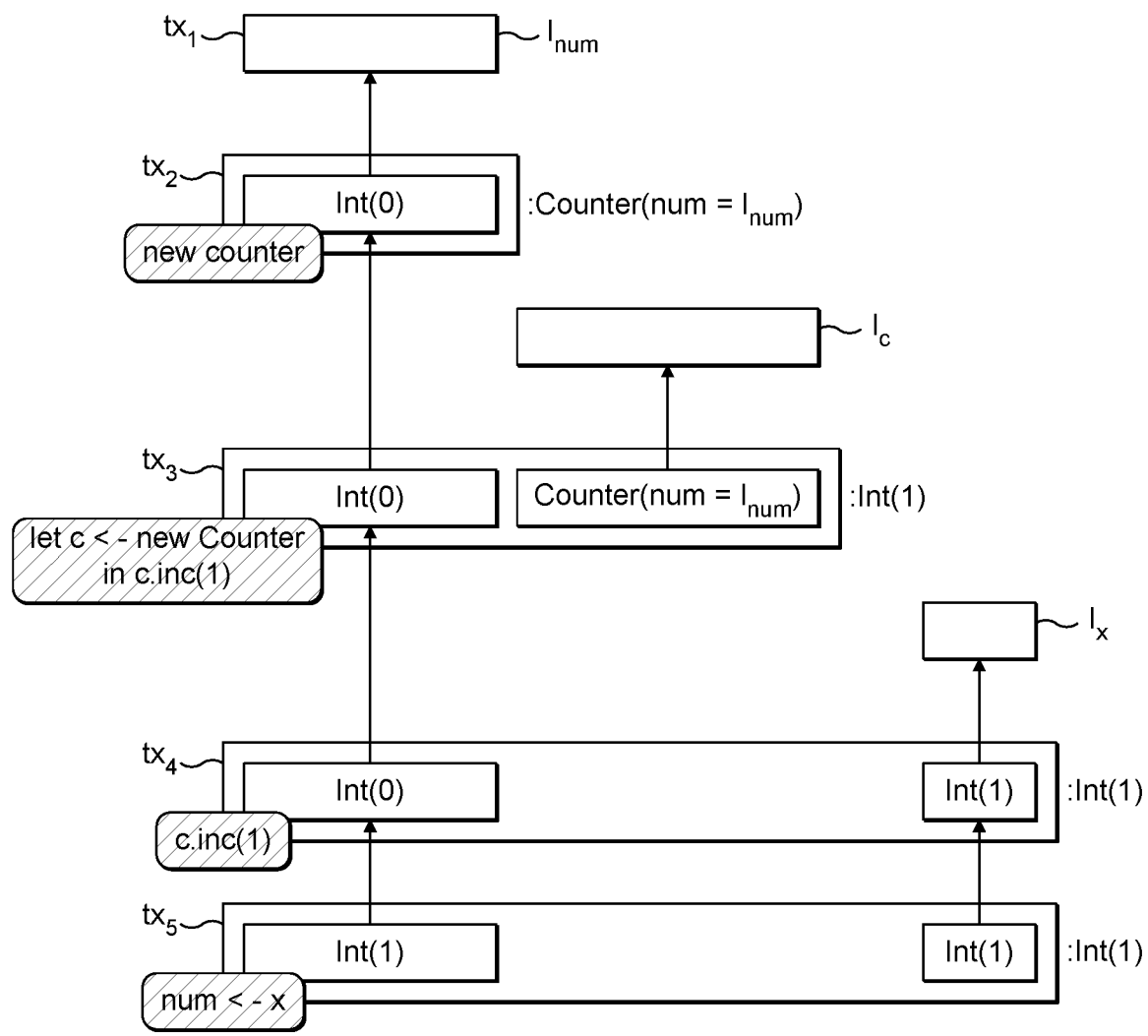
FIG. 11 is a diagram of the transactions that are broadcast when an expression let c<–new Counter in a.inc( ) is evaluated in a blockchain semantics in accordance with some embodiments of the present invention.

The first step in the evaluation of e is to evaluate new Counter. In the process transactions $tx_1$ and $tx_2$ are broadcast as shown in the FIG. 11. The value Counter(num=$l_{num}$) is returned and assigned to the counter variable as follows: a new location $l_c$ is obtained from the blockchain and transaction $tx_3$ is broadcast that updates the value stored in $l_c$ to Counter(num=$l_{num}$).

Finally, c.inc(1) is evaluated in the environment E=[c: $l_c$]. First, parameter 1 is evaluated to the value Int(1). Then a new unspent b-location $l_x$ is obtained and is initialized to Int(1) by transaction $tx_4$. Finally, the body num←x of the inc function is evaluated in the environment E=[num: $l_{num}$ x: $l_x$]. This broadcasts the transaction $tx_5$ that updates the value stored in $l_{num}$ to Int(1). The value returned from the entire expression e is Int(1).

Completeness of BCool

We associate a store $S_B$ with every blockchain B as follows. Let L be the set of b-locations in B and let $Val_L$ be the set of Cool values with locations in L. The store of B is a mapping $S_B$: L->$Val_L$ such that $S_B(l)$ is the value stored at the latest revision of l∈L.

Lemma 1. Let B be a blockchain with b-locations L. Let so∈$Val_L$, blockchain environment E, blockchain B, and expression e be given and let S=$S_B$. Then so, S, E⊢e: v, S' and so, B, E⊨s: v, B' implies that S'=$S_{B'}$.

Proof. By induction on e. If e does not change the store in the Cool semantics, then e does not change the blockchain under the BCool semantics and hence the statement is trivial.

Let so, E, B, and S be as in the assumption. Let $v_1, \ldots, v_n$ be values and let $l_1, \ldots, l_n$ be locations. Let S'=S[$v_1/l_1, \ldots, v_n/l_n$], tx=tx(B, [$v_1/l_1, \ldots, v_n/l_n$], loc(E)∪loc(so)\{$l_1, \ldots, l_n$}, e), and B'=B∪{tx}. We show that S'=$S_{B'}$. The Lemma follows by a straightforward induction over e.

There are two cases. If l=$l_i$ for some 1<=l<=n, then by definition S'(l)=$v_i$. Note that tx($B_i$, [$v_1/l_1, \ldots, v_n/l_n$], loc(E)∪loc(so)\{$l_1, \ldots, l_n$}, e) spends the latest revision of l into a successor labelled $v_i$. Hence B'(l)=$v_i$.

If l∉{$l_1, \ldots, l_n$} then S'(l)=S(l). If l∈loc(E)∪loc(so) then tx spends the latest revision of l into a successor that stores the value B(l), and hence B'(l)=B(l)=S(l)=S'(l). Otherwise tx does not spend the latest revision of l and the result follows trivially.

BCool semantics can be optimized further by, for example, using the following two techniques. The goal of the optimizations is to save costs when running a smart contract. To goal of the first optimization is to reduce the size of each transaction broadcast by not storing the values. The goal of the second optimization is to reduce the number of transactions broadcast. The result of applying both optimizations is a smart contract system that can run programs of arbitrary computational (time and space) complexity at a fixed cost.

DECREASING SIZE OF TRANSACTIONS: We define an alternative semantics for BCool expressions called the BC2 that broadcasts transactions that store only expressions and no values. The values, nevertheless, can be computed from the expressions stored on the blockchain. Below, we will refer to the BCool semantics defined above as the BC1. We define a new semantic relation $\vDash_2$ for BC2 that has one semantic rule [B2-R] for every rule [B-R] in BC1. The rule [B2-R] is obtained from [B-R] by replacing every occurrence of ⊨ by $\vDash_2$ and every line of the form B'=B∪{tx(B, [$v_1/l_1, \ldots, v_n/l_n$]loc(E)∪loc(so), e)} by a line of the form B'=B∪{tx(B, [ ], {$l_1, \ldots, l_n$}∪loc(E)∪loc(so), e)}

Note that the BC2 stores only expressions in the blockchain and no values. Therefore, using BC2 has the advantage that the size of a transaction is reduced and hence transaction fees are saved.

Figure 12:
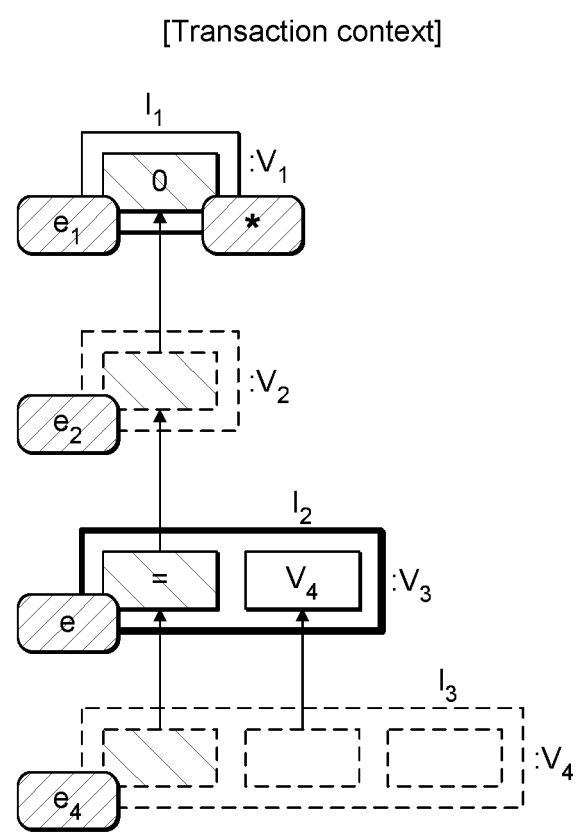
FIG. 12 is a diagram of a transaction context in accordance with some embodiments of the present invention.

We define the notion of a valid set of transactions for BC2. Valid transactions are built up from patterns called contexts. A context consists of a sequence of c-transactions and holes. Every context contains one distinguished c-transaction called the root of the context. Every hole contains a list of positions and every c-transaction contains a list of c-outputs. Holes and c-transactions are labeled by an expression. A node is either a position or an output and there is a binary relation called spend on nodes. FIG. 12 is a diagram of a transaction context in accordance with some embodiments of the present invention.

FIGS. 15 through 18 show four contexts labelled [Ctx-Assign], [Ctx-Let], [Ctx-New], [Ctx-Dispatch], respectively, the relation spend is indicated by the arrows. Note that the BC2 stores only expressions in the blockchain and no values. Therefore, using BC2 has the advantage that the size of a transaction is reduced, and hence transaction fees are saved. Nested boxes with solid lines represent transactions and outputs and arrows represent spending relations. Rectangles with a dashed border represent holes that contain positions. Each context has one transaction with a thicker border that is called the root of the context. In each context, a set of outputs is shown in backslash crosshatches. The locations of these outputs are called the connectors of the context.

Figure 13:
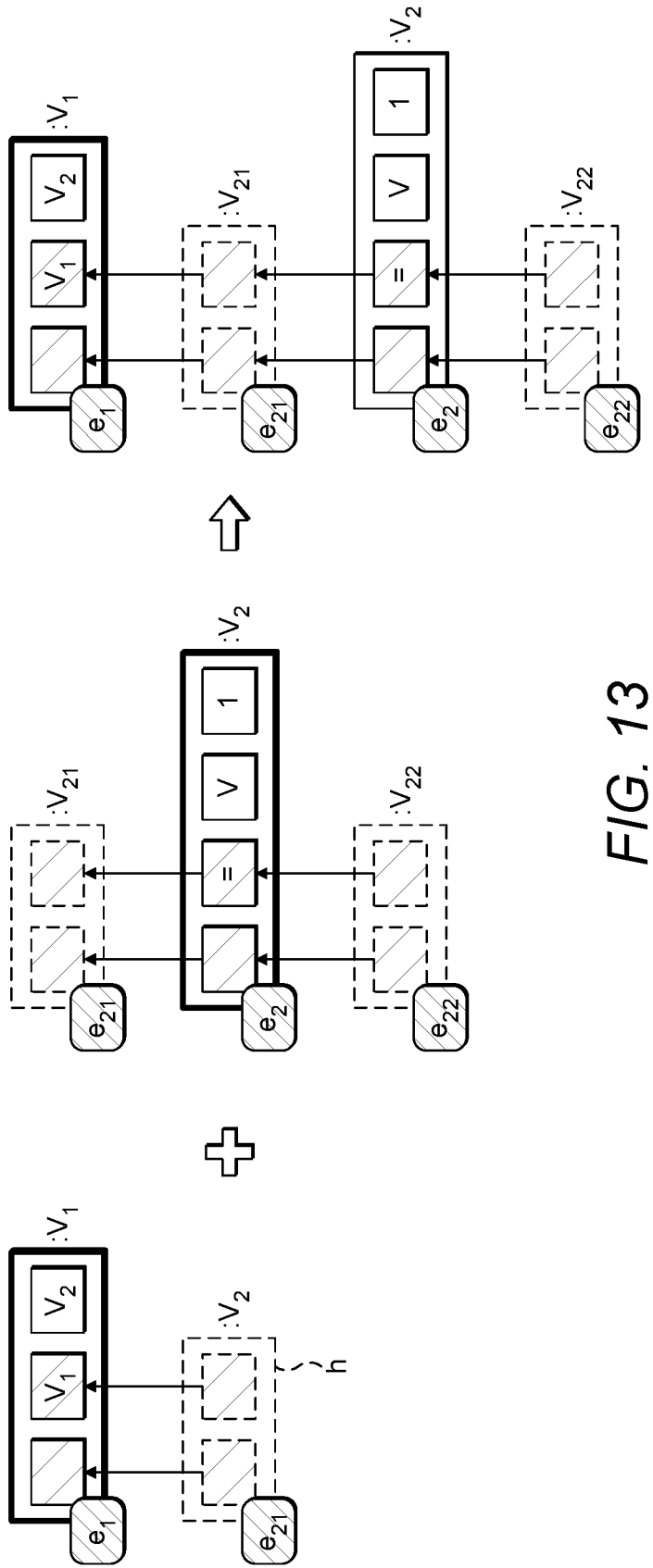
FIG. 13 is a diagram of a process of plugging a context into a hole in accordance with some embodiments of the present invention.
Figure 14:
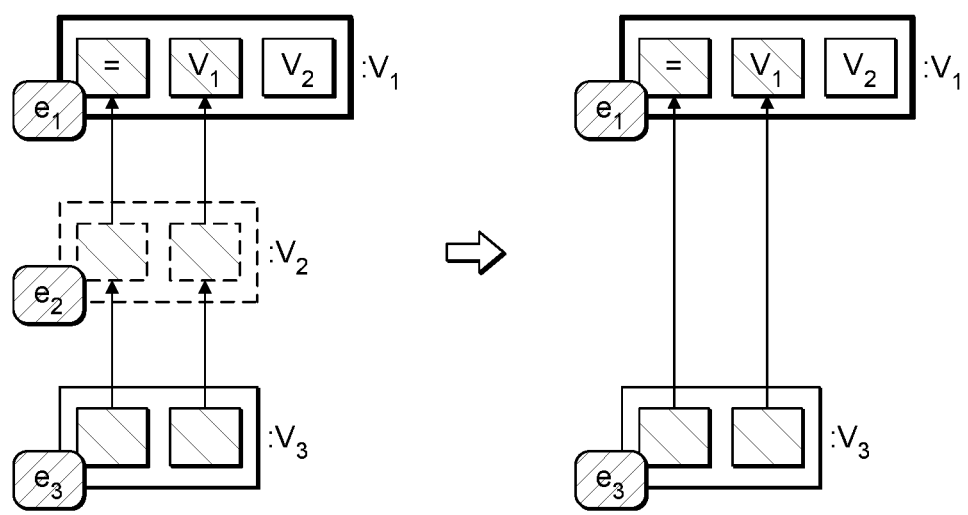
FIG. 14 is a diagram of a process of plugging an empty context into a hole in accordance with some embodiments of the present invention.
Figure 15:
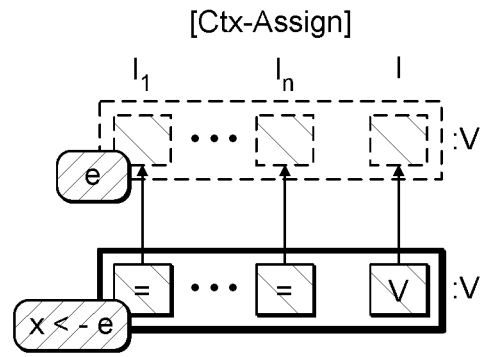
FIG. 15 is a diagram of context [Ctx-Assign] for semantic rule [B-Assign] of a blockchain semantics in accordance with some embodiments of the present invention.
Figure 16:
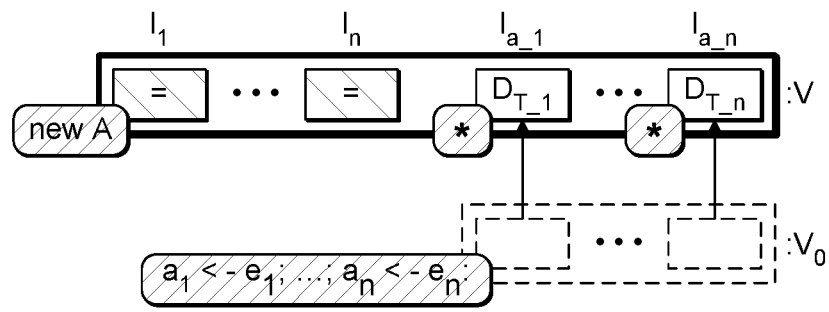
FIG. 16 is a diagram of context [Ctx-New] for semantic rule [B-New] of a blockchain semantics in accordance with some embodiments of the present invention.
Figure 17:
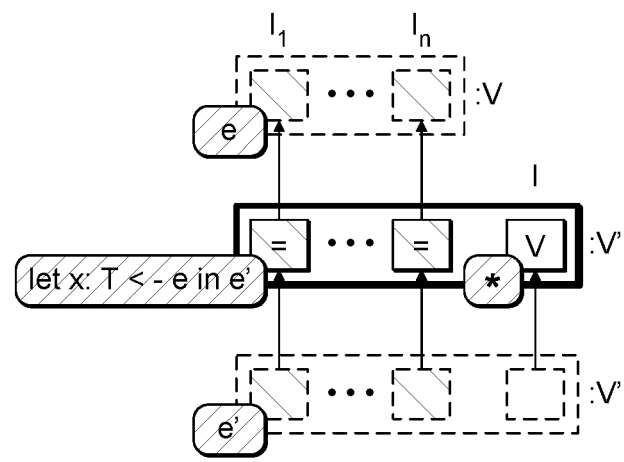
FIG. 17 is a diagram of context [Ctx-Let] for semantic rule [B-Let] of a blockchain semantics in accordance with some embodiments of the present invention.
Figure 18:
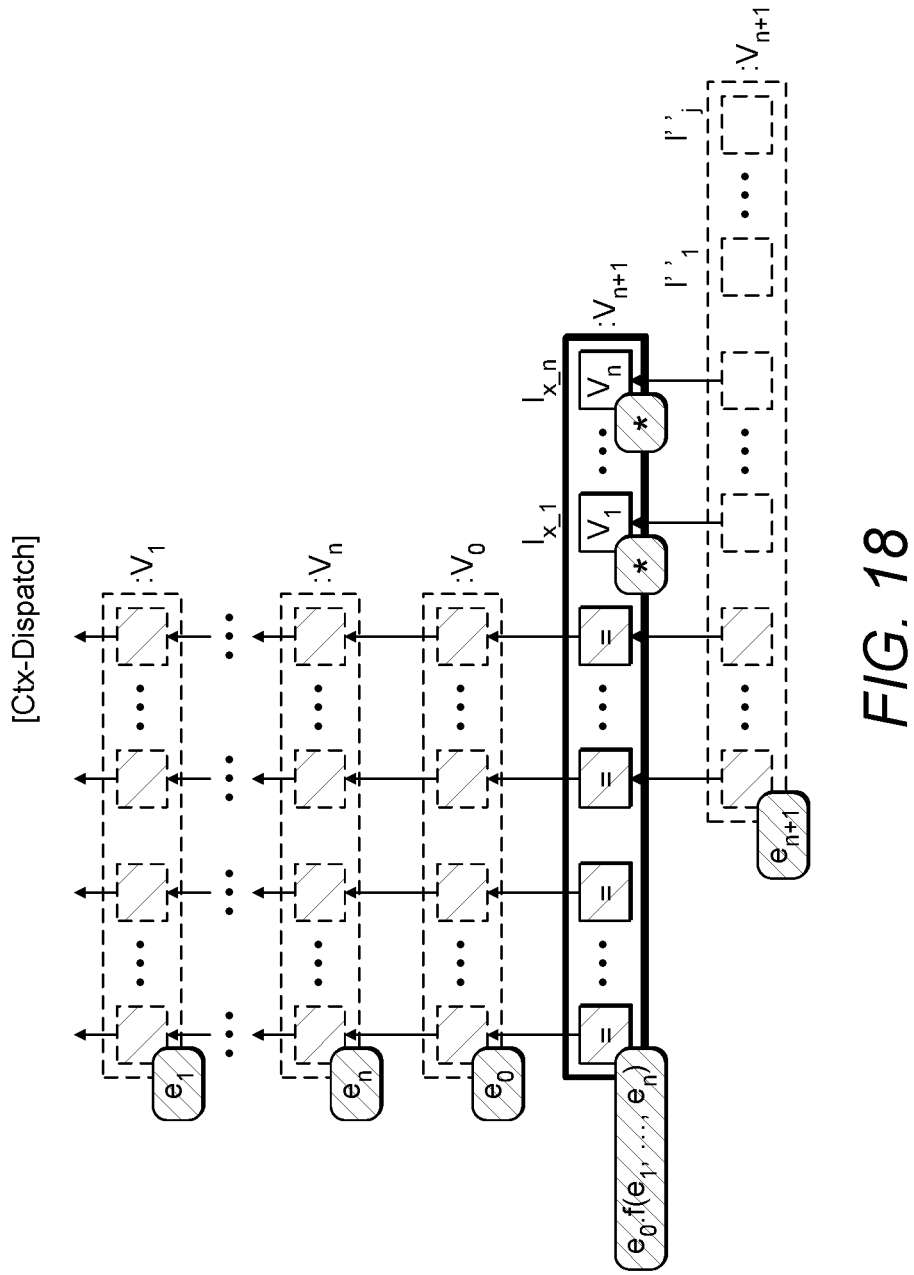
FIG. 18 is a diagram of context [Ctx-Dispatch] for semantic rule [B-Dispatch] of a blockchain semantics in accordance with some embodiments of the present invention.

FIG. 13 shows context C with n connectors. This context can be plugged into a hole h of a context C' with n positions if the hole and the context are labeled by the same expression. We denote the resulting context by C'[h<-C]. The root of C'[h<-C] is the root of C'. [000156] An empty context can be plugged into any hole. This process is shown in FIG. 14.

A transaction pattern is a context that contains only nodes. The transaction pattern for expression e is obtained recursively by plugging the transaction pattern for each subexpression e' of e into the e' labeled hole of the context for e. A set of transactions T satisfies a transaction pattern P if there is a one to one mapping iso: T->P between the c-transactions in P and the transactions in T, such that t in T has n inputs and m outputs if and only if iso(t) has n c-outputs with in-degree>0 and m c-outputs with out-degree>0, and the i-th input oft spends by the j-th out of t' if and only if there is an edge from iso(t) to iso(t')

the expression on the first inputs oft is the expression on the label of iso(t).

A set of transactions T is valid if it satisfies some transaction pattern that can be obtained from the contexts shown in FIGS. 15-18.

The following lemma allows multiple users to read the expressions in transactions that are broadcast by BC2 and all perform the same computations on their own devices using the Cool semantics. This way, users can gain consensus over the state of a system that they can modify according to predefined rules.

Lemma 2: For every blockchain B, there is a store $S_B$ such that if T is a valid set of transactions then one can compute a value $so_{T, B}$, an environment $E_{B, T}$, and an expression $e_{B, T}$, such that $so_{B, T}$, $S_B$, $E_{B, T}$⊢$e_{B, T}$: v, S' for some v and S'=$S_{B \cup T}$.

Proof. Let B and T be given. The proof is by induction on the size of B∪T. As T is valid it satisfies a transaction pattern $P=[ct_1, \ldots, ct_n]$ obtained from the contexts in FIGS. 15-18. Then P can be parsed into one of the contexts $[h_1, \ldots, h_n, r, h'_1, \ldots, h'_m]$ of FIGS. 15-18 where r is the root of P.

Let $T_1, \ldots, T_n$, be the subsets of T that correspond to the holes $h_1, \ldots, h_n$ of the pattern P under the mapping iso from T to P. Let $B_i = B \cup T_1 \cup \ldots \cup T_i$, for $1 \leq i \leq n$. We apply the induction hypothesis sequentially to $B_1, \ldots, B_n$. By induction, we compute a values $so_i$, environments $E_i$, and expressions $e_i$ such that $so_i, S_i, E_i | - e_i: v_i, S_{i+i}$ where $S_i = S_{B\_i}$ for $1 \leq i \leq n$.

Next, given $S_n$, we computer the store $S_{n+i}$ for the blockchain $B_n \cup \{r\}$. Let $e_0$ be the expression on the first output of r.

If the $e_0$ is of the form $Id <- e$, then n=1 and we lookup Id in the environment $E_1$ to determine its location l. We define $S_3 = S_2[v_1/l]$, where $v_1$ is the value we computed from the transactions for e in step 1.

We next define the self-object $so_{n+1}$. We first determine the locations of $so_{n+1}$. Let $Outs_{so}$ be the sequence outputs of r that have the self-object bit set. For each output out in $Outs_{so}$ let $l_{out}$ be its location. We next determine an identifier $Id_{out}$ for each out $\in Outs_{so}$. Consider the expression $e_{gen}$ stored in the transaction $t_{gen}$ that spends $l_{out}$. One can determine from FIGS. 15-18 that $e_{gen}$ must be a let-expression, a new-expression, or a dispatch-expression. If $e_{gen} = Id <- e$, then we define $Id_{out} = Id$. If $e_{gen}$ is new A such that $class(A) = (a_1: T_1 <- e_1, \ldots, a_j: T_j <- e_j)$ and out is the j-th output of r, then $Id_{out} = a_j$. If $e_{gen} = e'_0.f(e'_1, \ldots, e'_n)$, A is the type of $e'_0$, implementation$(A, f) = (x_1, \ldots, x_n, e_{body})$, and out is the j-th output of r, then we define $Id_{out} = x_j$. We define $so_{i+1}$ to be $(Id_{out\_1} = l_{out\_1}, \ldots, Id_{out\_k} = l_{out\_k})$ such that $Outs_{so} = [out_1, \ldots, out_k]$. The environment $E_{n+1}$ can be constructed from the outputs $Outs_E$ of r that have the environment bit set in the same way. Let $e_{n+1}$ be the expression $e_0 = Id <- e$ stored in the first output of r. One can check that $so_{n+1}, S_{n+1}, E_{n+1} | - e_{n+1}: S_{n+2}$ for some $v_{n+1}$ and $S_{n+2}$.

The case where $e_0$ is of the for let $Id <- e$ in $e'$ is similar: Again, by inspecting the patters [Ctx-Let], one can verify that $so_1, S_1, E_1$ were computed in step 1 such that $so_1, S_1, E_1 | - e_1: v_1, S_2$. Also, we can tell that r must have k'+1 outputs and k' inputs for some number k'. Let out be the last output of r and let $l_{out}$ be its location. We define $S_3 = S_2[v_1 \setminus l_{out}]$ and $e_{n+1}$ to be let $Id <- e$ in $e'$. Again it is easy to check that $S_{n+1}, E_{n+1} | - e_{n+1}: S_{n+2}$ for $v_{n+1}$ and $S_{n+2}$.

The cases for $e_0$=new A is based on the same ideas. The object so and the environment can be obtained as in the cases for assignment and let expressions. We apply the induction hypothesis and update the store locations $l_{a\_1}, \ldots, l_{a\_n}$ with the default values $D_{T\_1}, \ldots, D_{T\_n}$ for their types $t_1, \ldots, t_n$ as indicated in FIG. 14.

The case of a method dispatch $e_0 = e.f(e_1, \ldots, e_n)$ is also similar. The value so and the environment E are determined as in the cases before. We apply the induction hypothesis and update the store locations $l_{x\_1}, \ldots, l_{x\_n}$ with the default values $v_1, \ldots, v_n$ computed in the recursive calls as above. [000168] In the third step we apply the induction hypothesis to the transactions $T'_1, \ldots, T'_m$ that correspond to the holes $h'_1, \ldots, h'_m$ after r. The lemma follows for the last self-object, environment, and store computed.

Decreasing the Number of Transactions: We can sketch a third semantics BC3 for BCool expressions. The idea is to evaluate the expression in the Cool semantics first and only store one transaction for each expression that is broadcast. However, as expressions can evaluate sub-expressions in a new environment, one may not get away with only spending the environment in each transaction. It is instead necessary to spend every position that was read, while evaluating the expressions e. This makes it possible to compute values instead of storing them as described in the section on BC2.

The invention has been disclosed in at least three smart contract semantics for existing object-oriented programming language. The semantics BC2 and BC3 are more practical than BC1 in some applications.

BC2 makes it very hard for a user to cheat. All a user can do is broadcast a transaction with an invalid expression. In this case, the evaluation just throws an error. Under BC2 it is impossible for a user to broadcast a transaction leads to a state in the store that is not reachable in the program.

BC3 has practical relevance because of the low cost that it permits users to run a smart contract. This makes it possible to run smart contracts of arbitrary complexity at a fixed cost.

While the foregoing descriptions disclose specific examples, other examples may be used to achieve similar results. Further, the various features of the foregoing embodiments may be selected and combined to produce numerous variations of improved systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
generating an instruction in a first object-oriented computer language for operating in a decentralized computer network from an instruction in a second object-oriented computer language that can operate on a local computer, where a semantic of the second object-oriented computer language can be expressed by a rule so, S, E, ⊢e: v, S' with ⊢ denoting a semantic relation, the rule meaning that in a context where a variable self refers to an object so, where a data store on the local computer is S, and where an execution environment is E, an expression e evaluates to an object v at a second data store S' in the local computer;
replacing a local storage update command S[v/l], which updates at least one location l by the object v, by a command to
  (a) broadcast to the decentralized computer network at least one transaction that spends at least one unspent-transaction-output corresponding to the location l into a new output that stores at least one of (i) the object v and (ii) information enabling the object v to be determined; and
  (b) spending at least one additional unspent-transaction-output corresponding to a second location l in the execution environment E or the object so;
wherein the generated instruction in the first object-oriented computer language enables operation of a smart contract.

2. The method of claim 1, wherein the generated instruction in the first object-oriented computer language is a storage-update instruction, and wherein the storage-update instruction either immediately precedes a recursive call to a first semantic relation or is located at an end of a body of the rule of expressed the second object-oriented computer language.

3. The method of claim 1, wherein the instruction in the first object-oriented computer language is an instruction for storing a data structure D at an unspent memory location OUT on the decentralized computer network, the data structure D further including a data structure D', where the data structure D' further includes a data structure D'', the method further comprising steps of:
  (a) receiving, at the local computer, a request to store the data structure D at an unspent memory location OUT on the decentralized computer network;
  (b) creating, at the local computer, a request TX, to the decentralized computer network, to spend the unspent memory location OUT and to generate a new unspent memory location OUT' on the decentralized computer network;
  (c) using the local computer to sign and broadcast the request TX to the decentralized computer network;
  (d) receiving the request TX at the decentralized computer network;
  (e) using the decentralized computer network to determine validity of the request TX according to a protocol of the decentralized computer network; and
  (f) if the request TX is determined to be valid, performing steps of
    (i) spending the unspent memory location OUT on the decentralized computer network and generating the new unspent memory locations OUT' on the decentralized computer network; and
    (ii) repeating steps (a) through (f)(i) above while using the data structure D' in place of the data structure D and while using the memory location OUT' in place of the memory location OUT.

4. The method of claim 1, wherein the decentralized computer network is an unspent-transaction-outputs blockchain.

5. The method of claim 1, wherein a source code of a program written in one of the first computer language and the second computer language is stored in a transaction.

6. The method of claim 5, where the transaction represents object creation.

7. A computer system comprising a local computer, the local computer comprising:
  a) a memory for storing computer instruction and data; and
  b) a processor operatively coupled to the memory, the processor capable of generating an instruction in a first object-oriented computer language for operating in a decentralized computer network from an instruction in a second object-oriented computer language that can operate on the local computer, where a semantic of the second object-oriented computer language can be expressed by a rule so, S, E, ⊢e: v, S' with ⊢ denoting a semantic relation, the rule meaning that in a context where a variable self refers to an object so, where a data store on the local computer is S, and where an execution environment is E, an expression e evaluates to an object v at a second data store S' in the local computer, the local computer configured to perform
  replacing a centralized storage update command S[v/l], which updates at least one location l by the object v, by a command to broadcast to the decentralized computer network at least one transaction that spends at least one unspent-transaction-output corresponding to the location l into a new output that stores at least one of (i) the object v and (ii) information enabling the object v to be determined; and that spends at least one additional unspent-transaction-output corresponding to a second location l' in the execution environment E or the object so;
  wherein the generated instruction in the first object-oriented computer language enables operation of a smart contract.

8. The computer system of claim 7, wherein the decentralized computer network is an unspent-transaction-outputs blockchain.

9. The computer system of claim 7, wherein the instruction in the first object-oriented computer language is an instruction for storing a data structure D at an unspent memory location OUT on the decentralized computer network, the data structure D further including a data structure D', wherein the data structure D' further includes a data structure D'', and
  (a) wherein the local computer is configured to receive a request to store the data structure D at the unspent memory location OUT on the decentralized computer network;
  (b) wherein the local computer is configured to create a request TX to the decentralized computer network, to spend the unspent memory location OUT, and to generate a new unspent memory location OUT' on the decentralized computer network;

(c) wherein the local computer to is configured to enable signing and broadcasting the request TX to the decentralized computer network;

(d) wherein the decentralized computer network is configured to receive the request TX;

(e) wherein the decentralized computer network is configured to enable determining validity of the request TX according to a protocol of the decentralized computer network; and (f) if the request TX is determined to be valid,
   (i) the decentralized computer network further configured to spend the unspent memory location OUT on the decentralized computer network and to generate the new unspent memory locations OUT' on the decentralized computer network; and
   (ii) wherein the computer system is configured to repeating operations (a) through (f)(i) above while using the data structure D' in place of the data structure D and while using the memory location OUT' in place of the memory location OUT.

10. The computer system of claim 7, wherein a source code of a program written in one of the first computer language and the second computer language is stored in a transaction that represents object creation.

* * * * *